United States Patent
Gilder

(10) Patent No.: US 7,566,406 B2
(45) Date of Patent: Jul. 28, 2009

(54) BONDED FOAM PRODUCT MANUFACTURED WITH VEGETABLE OIL POLYOL AND METHOD FOR MANUFACTURING

(75) Inventor: Stephen D. Gilder, Collierville, TN (US)

(73) Assignee: L&P Property Management Company, South Gate, CA (US)

( * ) Notice: Subject to any disclaimer, the term of this patent is extended or adjusted under 35 U.S.C. 154(b) by 406 days.

(21) Appl. No.: 11/230,798

(22) Filed: Sep. 20, 2005

(65) Prior Publication Data

US 2006/0251881 A1    Nov. 9, 2006

Related U.S. Application Data

(60) Provisional application No. 60/678,123, filed on May 5, 2005.

(51) Int. Cl.
*C09K 3/00* (2006.01)
*B05D 3/02* (2006.01)

(52) U.S. Cl. ............... 252/182.2; 252/182.13; 427/372.2; 427/377

(58) Field of Classification Search ............ 528/48; 521/53, 54, 55; 252/182.13, 182.2; 427/372.2, 427/377
See application file for complete search history.

(56) References Cited

U.S. PATENT DOCUMENTS

| | | | |
|---|---|---|---|
| 2,787,601 A | 4/1957 | Detrick et al. | 260/2.5 |
| 2,833,730 A | 5/1958 | Barthel, Jr. | 260/2.5 |
| 3,747,037 A * | 7/1973 | Earing | 336/96 |
| 3,969,262 A | 7/1976 | Wagner et al. | |
| 4,170,697 A | 10/1979 | Blount | |
| 4,185,146 A | 1/1980 | Burke | |
| 4,273,908 A | 6/1981 | Blount | |
| 4,275,172 A | 6/1981 | Barth et al. | |
| 4,283,311 A | 8/1981 | Blount | |
| 4,296,211 A | 10/1981 | Blount | |
| 4,301,254 A | 11/1981 | Blount | |
| 4,314,916 A | 2/1982 | Blount | |
| 4,316,967 A | 2/1982 | Hergenrother et al. | |

(Continued)

OTHER PUBLICATIONS

"Biobased" Polyols: An Exceptional "New Use" Agricultural Product, Soyol Polyols and Systems for Urethanes, 2002-2004, 2 pgs.

(Continued)

*Primary Examiner*—Mark Eashoo
*Assistant Examiner*—Melissa Winkler
(74) *Attorney, Agent, or Firm*—Conley Rose, P.C.; Kristin Jordan Harkins

(57) ABSTRACT

A bonded foam product manufactured with a vegetable oil polyol is herein disclosed. The pre-polymer for use as a binder in the manufacture of a bonded foam product comprises an isocyanate and a vegetable oil polyol, wherein the pre-polymer is substantially free of any petrochemical polyol. In another aspect, the invention is method for making a bonded foam product, the method comprising coating a plurality of foam pieces with a pre-polymer, the pre-polymer comprising an isocyanate and a vegetable oil polyol, wherein the pre-polymer is substantially free of any petrochemical polyol, compressing the foam pieces into a foam log of a desired density, and steaming the foam log to cure the pre-polymer. If desired, a process oil may be added to the pre-polymer to modify the viscosity of the pre-polymer.

25 Claims, 3 Drawing Sheets

U.S. PATENT DOCUMENTS

| | | | |
|---|---|---|---|
| 4,336,340 A | 6/1982 | Blount | |
| 4,347,345 A | 8/1982 | Blount | |
| 4,376,171 A | 3/1983 | Blount | |
| RE31,340 E | 8/1983 | Blount | |
| 4,452,551 A | 6/1984 | Arndt et al. | |
| 4,859,735 A | 8/1989 | Vu | |
| 4,871,590 A | 10/1989 | Merz et al. | |
| 4,877,829 A | 10/1989 | Vu et al. | |
| 4,977,207 A | 12/1990 | Hoefer et al. | |
| 5,102,953 A | 4/1992 | Yano et al. | |
| 5,182,163 A | 1/1993 | Wheat et al. | |
| 5,278,223 A | 1/1994 | Gruenewaelder et al. | |
| 5,306,798 A | 4/1994 | Horn et al. | |
| 5,387,642 A | 2/1995 | Blum et al. | |
| 5,447,963 A | 9/1995 | Pcolinsky et al. | |
| 5,482,980 A | 1/1996 | Pcolinsky | 521/130 |
| 5,527,834 A | 6/1996 | Fujita et al. | |
| 5,688,835 A | 11/1997 | Scherbel et al. | |
| 5,817,703 A * | 10/1998 | Blair et al. | 521/53 |
| 6,054,499 A * | 4/2000 | Pauls et al. | 521/132 |
| 6,071,977 A | 6/2000 | Austin et al. | |
| 6,180,686 B1 | 1/2001 | Kurth | |
| 6,231,985 B1 | 5/2001 | Chen et al. | |
| 6,265,456 B1 | 7/2001 | Austin et al. | |
| 6,294,589 B1 * | 9/2001 | Moody | 521/76 |
| 6,348,121 B1 | 2/2002 | Schoener et al. | |
| 6,365,650 B1 | 4/2002 | Chen et al. | |
| 6,465,569 B1 | 10/2002 | Kurth | |
| 6,573,354 B1 | 6/2003 | Petrovic et al. | |
| 6,624,244 B2 | 9/2003 | Kurth | |
| 6,632,873 B2 | 10/2003 | Chen et al. | |
| 6,686,435 B1 | 2/2004 | Petrovic et al. | |
| 6,864,296 B2 | 3/2005 | Kurth | |
| 6,867,239 B2 | 3/2005 | Kurth | |
| 2002/0031669 A1 | 3/2002 | Chen et al. | |
| 2002/0119321 A1 | 8/2002 | Kurth et al. | |
| 2003/0138621 A1 | 7/2003 | Bollmann et al. | |
| 2004/0029988 A1 | 2/2004 | Kurth | |
| 2004/0034163 A1 | 2/2004 | Kurth | |
| 2004/0039146 A1 * | 2/2004 | Shidaker et al. | 528/48 |
| 2004/0102596 A1 | 5/2004 | Kurth | |
| 2004/0123934 A1 | 7/2004 | Hamrick et al. | |
| 2004/0151916 A1 | 8/2004 | Chen et al. | |
| 2004/0175407 A1 | 9/2004 | McDaniel | |
| 2004/0180806 A1 | 9/2004 | Esselbrugge et al. | |
| 2004/0209971 A1 | 10/2004 | Kurth et al. | |
| 2005/0004245 A1 | 1/2005 | Hamrick et al. | |
| 2005/0013793 A1 | 1/2005 | Beckman et al. | |
| 2005/0013987 A1 | 1/2005 | Carr et al. | |
| 2005/0025930 A1 | 2/2005 | Hamrick et al. | |
| 2005/0032925 A1 | 2/2005 | Kaplan | |
| 2005/0080218 A1 | 4/2005 | Thiele et al. | |

OTHER PUBLICATIONS

Nozawa, Katsuhisa, et al., "Novel Vegetable Oil-Based Based Polyol," Mitsui Takeda Chemicals, Inc., pp. 50-56, presented at the Polyurethanes 2005 Technical Conference & Trade Fair, Oct. 17-19, 2005.

Downey, William J., "Castor Derivatives—A Natural Alternative to Phthalate Plasticizers for Polyurethanes," CasChem, pp. 509-515, presented at the Polyurethanes 2005 Technical Conference & Trade Fair, Oct. 17-19, 2005.

* cited by examiner

BONDED FOAM PRODUCT MANUFACTURED WITH VEGETABLE OIL POLYOL AND METHOD FOR MANUFACTURING

CROSS-REFERENCE TO RELATED APPLICATIONS

This application claims priority from U.S. Provisional Application 60/678,123 filed May 5, 2005.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to methods for making the bonded foam products, such as bonded foam flooring underlayment.

BACKGROUND

In its broadest sense, a floor is comprised of a subfloor over which a decorative covering is installed. Typically, the subfloor is either a slab of concrete or one or more sheets of plywood supported by a combination of joists, beams, posts and, in multiple-story buildings, bearing walls. The primary types of floor coverings used in structures are "soft" floor coverings and "hard" floor coverings. As its name suggests, soft floor coverings are soft, quiet underfoot, and tend to yield upon application of a force thereto. Hard floor coverings, on the other hand, are hard and rigid, but tend to be durable and easy to maintain.

Generally, an underlayment is installed between the subfloor and the floor covering. The underlayment provides a cushion and decreases the wear of the floor covering. Underlayment also smoothes imperfections in the subfloor. Cushioning is important for both hard floor coverings and soft floor coverings, although the type of underlayment varies for each application. Hard floor coverings, such as wood, tend to have thinner, denser underlayments that absorb the sound of a person walking on the hard floor coverings. Soft floor coverings, such as carpet, tend to have thicker, less dense underlayment to enhance the softness of the soft flooring product, reduce wear, improve cleaning, and reduce high points or "peaks", low points or "valleys", and other irregularities in the subfloor. Underlayments may also provide a more level surface for floor coverings.

Underlayments are made out of various different types of materials. Some underlayments are made out of nonwoven fiber batts. Other underlayments are made out of foam coated onto a woven or nonwoven fabric scrim or substrate. Foam rubber or latex can also be used as underlayment. Additionally, underlayment can be composed of prime polyurethane foam, which is cut to various thicknesses from larger foam blocks. These prime polyurethane blocks do not incorporate the use of ground, recycled scrap polyurethane into the process, as in bonded foam. Prime foam is produced by mixing various chemical compounds together to create highly cross-linked polyurethane chains where density is primarily controlled by the amount of water in the formulation, and to a lesser extent, the degree of off-gassing resulting from the reaction of water and isocyanate, which influences the degree of cell expansion.

Perhaps the most common type of underlayment is bonded foam underlayment. Bonded foam underlayment is manufactured by shredding scrap foam into small pieces and then forming a larger piece of bonded foam from the shredded pieces of scrap foam. In one method, after the scrap foam is shredded, the foam pieces are coated with a pre-polymer comprised of isocyanate and polyol, and compressed into a foam log. Moisture, usually steam, is then added to the foam log to cure the pre-polymer, thereby binding the foam pieces together.

One of the ongoing concerns of many bonded foam underlayment manufacturers is the need to reduce manufacturing costs. Lowered manufacturing costs result in lower product costs, which make the bonded foam underlayment more appealing to the consumers. Bonded foam underlayment consumers, particularly large retail outlets and flooring installers, are constantly seeking the lowest price on flooring underlayment and frequently change suppliers in order to save a few cents per square foot of underlayment. Thus, it is in the manufacturers' best interest to produce flooring underlayment for the lowest possible price. As the cost of upgrading manufacturing equipment to improve efficiency can be prohibitive, most manufacturers seek to lower production costs by using less expensive materials to manufacture the underlayment.

Another ongoing concern regarding bonded foam operations is the byproducts produced when mixing and curing the pre-polymer. Traditional bonded foam pre-polymers and their chemical precursors generate numerous volatile organic compounds (VOCs) as a result of raw material chemical vapors or the reaction between the isocyanate and the polyol. VOC emissions are closely monitored and regulated by the Environmental Protection Agency (EPA) and other environmental groups and in many cases there are limits on the amount of VOCs that a manufacturing facility can emit. Thus, any process or product that reduces the VOC emissions is preferable because it is more environmentally friendly than the current bonded foam processes. In addition to the environmentally beneficial aspects, a sufficient reduction in VOCs allows manufacturers to market their products as "green", which is a product trait preferred by many consumers.

Consequently, there exists a need for a flooring underlayment that is less expensive to manufacture than existing flooring underlayments, which will allow manufacturers to produce and sell a flooring underlayment to consumers at a reduced cost. A need also exists for a method for reducing the VOC emissions associated with a bonded foam production process. A new method for manufacturing bonded foam product has now been found which employs vegetable oil polyol. The process and resulting product provide a lower cost, higher quality product and the manufacturing process reduces VOC emissions.

BRIEF DESCRIPTION OF THE DRAWINGS

For a more complete understanding of the present invention, and for further details and advantages thereof, reference is now made to the accompanying drawings, in which.

DETAILED DESCRIPTION

Figure 1:
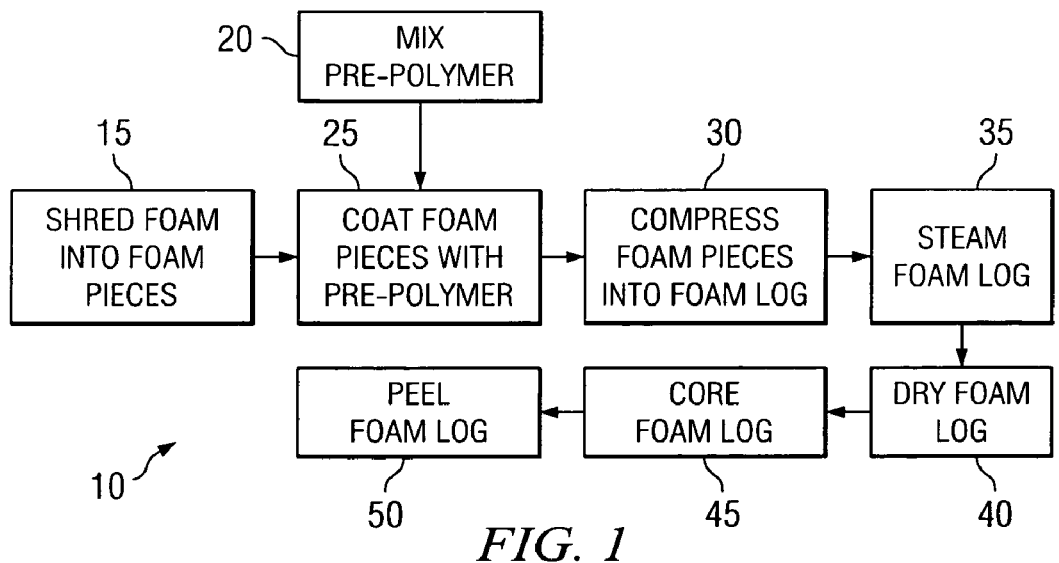
FIG. 1 is a block diagram of one embodiment of a method for making the bonded foam product manufactured with vegetable oil polyol.

The bonded foam product manufactured with vegetable oil polyol will now be described in further detail. The bonded foam product manufactured with vegetable oil polyol is a bonded foam product, preferably flooring underlayment, manufactured using a pre-polymer formulation that utilizes a vegetable oil polyol in the pre-polymer. While a variety of vegetable oil polyols may be used in the pre-polymer formulation, the preferred vegetable oil polyol is castor oil polyol. Use of the vegetable oil polyol in the pre-polymer is environmentally friendly, less expensive, and produces a higher quality product as compared to use of a petrochemical polyol in the pre-polymer.

The term "polyol" is a generic name for polymers and oligomers containing a large number of hydroxyl (OH) groups. Two important characteristics of a polyol are its functionality and its hydroxyl number. The functionality is a measure of the ability of a polyol to form covalent bonds with another molecule or group in a chemical reaction, expressed in terms of the number of functional groups capable of participating in the reaction, such as 1, 2, or 3. When polyols are manufactured, the functionality of the polyol is controlled by the selection of the initiator. For example, a glycol initiator produces a diol, a glycerin initiator produces a triol, an ethylene diamine initiator produces a tetrol, and a sorbitol initiator produces a hexol. By contrast, the hydroxyl number is a measure of the quantity of hydroxyl groups present in an organic material, expressed in terms of milligrams of potassium hydroxide required to produce a hydroxyl content equivalent to the hydroxyl content of one gram of the organic material (mg KOH/g). When polyols are manufactured, the hydroxyl number is controlled by the selection of the organic acids used in the polymerization reaction.

A vegetable oil polyol substantially free of petrochemical polyols is employed to manufacture a pre-polymer formulation. As opposed to petrochemical polyols which are produced from crude oil and other petroleum sources, vegetable oil polyols are derived from plants and other natural sources. Vegetable oil polyols are primarily triglycerides of fatty acids, which are composed of a carboxyl group attached to a longer chain of hydrocarbons. The vegetable oil polyols can be saturated, that is they do not contain any carbon-carbon double bonds, or unsaturated such that they contain carbon-carbon double bonds. Each vegetable oil polyol has a different distribution and concentration of carbon-carbon double bonds and hydroxyl groups, which means that each vegetable oil polyol gives the pre-polymer different characteristics in reaction speed and completion, viscosity, and composition. These differences in derivation and chemical structure are what distinguish a vegetable oil polyol from a petrochemical polyol.

There are a variety of vegetable oil polyols suitable for use in the pre-polymer formulation of the invention. Suitable vegetable oil polyols may be produced from any naturally occurring vegetable oil, such as soy oil, castor oil, safflower oil, sesame oil, peanut oil, cottonseed oil, olive oil, linseed oil, palm oil, vegetable oil, canola oil, and blends thereof. Of course, a person of ordinary skill in the art will appreciate that the aforementioned list is not exhaustive and that other vegetable oils exist with the suitable characteristics exemplified above. While use of any vegetable oil polyol in the pre-polymer formulation produces the benefits described herein, some vegetable oils require chemical processing before they are suitable for use as a vegetable oil polyol. For example, crude soy oil consists of 17 percent saturated triglycerides and 83 percent unsaturated triglycerides, with about 4.41 double bonds per triglyceride molecule. To convert crude soy oil into soy oil polyol, the crude soy oil must be functionalized. Functionalization is a process by which hydroxyl groups are added to the unsaturated portions of the molecule. Functionalization can be accomplished through hydroxylation, the addition of hydroxyl groups to the molecule. In crude soy oil, the saturated portion of the triglyceride cannot be functionalized; thus 17 percent of the soy oil cannot be converted into a polyol. Consequently, in order to maximize the environmental and economic benefits of the vegetable oil polyol, the preferred vegetable oil polyols are made from vegetable oils which require minimal processing to become suitable for use as a vegetable oil polyol. Especially preferred are those vegetable oils that require minimal changes in their chemical structure in order to be suitable for use as a vegetable oil polyol.

There are several benefits to using vegetable oil polyol to manufacture the bonded foam pre-polymer. Bonded foam underlayment produced using the vegetable oil polyol pre-polymer has superior tensile strength and percent elongation values compared with bonded foam underlayment produced using petrochemical polyol pre-polymer. In addition, use of the vegetable oil polyol pre-polymer causes the bonded foam operations to produce less VOCs than are produced using the petrochemical polyol pre-polymer. Moreover, because vegetable oil polyols are produced from plants, they are a renewable raw material and are thus more environmentally friendly. Furthermore, because the vegetable oil polyol has a higher hydroxyl number than petrochemical polyols, less vegetable oil polyol is needed in the pre-polymer formulations to achieve the required excess free isocyanate percentage compared to petrochemical polyols, resulting in less polyol use and lower pre-polymer costs. The required free isocyanate content is also less with vegetable oil polyol, resulting in less polyol use and lower pre-polymer costs. For example, a free isocyanate content of about 8 percent to about 10 percent results in acceptable vegetable oil polyol pre-polymer versus the free isocyanate content of about 10 percent to about 12 percent that is required for petrochemical polyol pre-polymer.

Castor oil polyol is an example of a preferred polyol because the castor oil does not require excess processing steps to be suitable for use as a polyol. Unlike soy oil and other vegetable oils that require substantial processing to be suitable for use as a polyol, castor oil does not require any chemical processing steps, such as hydroxylation, esterification, etherification, and so forth, which would modify the castor oil's chemical structure to make it suitable for use as a polyol. Generally, the castor oil is cleaned and filtered to remove solids from the oil. The castor oil may also be dried to reduce the moisture content within the castor oil. The castor oil may optionally be polymerized to increase its molecular weight; however polymerization does not substantially change the chemical structure of the underlying castor oil molecules, it merely connects them together. Different grades of castor oils can be obtained through various refining process steps, which result in different functionalities, hydroxyl numbers, and molecular weights, but in the most preferred embodiment, the castor oil molecules are substantially unmodified.

Castor oil polyol is also the most preferred vegetable oil polyol because it has a combination of preferable chemical properties. Castor oil consists of about 90 percent ricinoleic acid, which is an 18 carbon acid having a double bond between the $9^{th}$ and the $10^{th}$ carbons and a hydroxyl group on the $12^{th}$ carbon. The combination of unsaturated carbon bonds and a hydroxyl group is rare and only occurs in a few vegetable oils, one of which is castor oil. Castor oil polyol also has a relatively high hydroxyl number, generally in the range of about 150 to about 170, whereas petrochemical polyols have a lower hydroxyl number, generally in the range of 40 to 70. The higher hydroxyl number means that, compared to petrochemical polyols, less castor oil polyol is required to react with a given amount of isocyanate. The combination of chemical structure and high hydroxyl number makes the castor oil polyol more chemically efficient than the petrochemical polyol for use in pre-polymer for bonded foam operations.

In addition to its chemical properties, castor oil has various physical properties that make it the preferred vegetable oil polyol. For example, castor oil has a lower oxidation rate than many of the other vegetable oil polyols, including soy oil polyol. Thus, the castor oil polyol has a longer shelf life than many of the other vegetable oil polyols, including soy oil polyol. In addition, the castor oil polyol has a clear color, whereas soy oil and other vegetable oil polyols have a brown or yellow color. The clear color is preferred because it does not change the color of the bonded foam product, whereas the yellow or brown color in other vegetable oil polyols affects the color of the bonded foam product. Furthermore, castor oil has a lower viscosity than most of the other vegetable oil polyols, including soy oil polyol. Soy oil polyol, such as Biobased's Agrol 3.0, generally has a viscosity of at least about 3,500 centipoise (cp), which is substantially greater than the viscosity of castor oil polyol such as POLYOL 3000 available from Rutherford Chemicals LLC's CasChem Division, which has a viscosity of about 400 cp. As explained in detail below, process oil with a viscosity of about 30 to about 50 cp has to be added to the pre-polymer to reduce the viscosity to the preferred level of less than 1,000 cp. If the vegetable oil polyol has a higher viscosity, as is the case with soy oil polyol, additional process oil has to be added to the pre-polymer in order to reduce the viscosity, which increases the cost of the pre-polymer. Thus, less process oil has to be added to the pre-polymer when castor oil polyol is used as compared with other vegetable oil polyols, such as soy oil. The odor of castor oil polyol is not as strong as other vegetable oil polyols, including soy oil polyol, resulting in less of a retained odor in the bonded foam product.

FIG. 1 depicts a block diagram of the major steps comprising one embodiment of a method 10 for making the bonded foam product manufactured with vegetable oil polyol. The method 10 comprises: shredding foam into foam pieces 15, separately mixing a pre-polymer 20, coating the foam pieces with the pre-polymer 25, compressing the foam pieces into a foam log 30, steaming the foam log 35, drying the foam log 40, coring the foam log 45, and peeling the foam log 50 into sheets which may be used as flooring underlayment. Each of these steps is described in greater detail below.

The method 10 for making the bonded foam product manufactured with vegetable oil polyol begins with foam, typically, scrap foam trimmings. The method 10 may be performed by the manufacturer of bonded foam products using scrap foam trimmings provided by a third party, for example, prime foam manufacturer, or, in the alternative, may be part of a recycling program instituted by a prime foam manufacturer or other manufacturer of foam products. Furthermore, the foam may either be new foam or recycled foam previously employed in the formation of bonded foam. The size and shape of the foam is unimportant because, as previously set forth, the foam is shredded into a plurality of smaller foam pieces at 15 of the method 10. Variously, it is contemplated that the foam may be polyurethane, latex, polyvinyl chloride (PVC), or any other polymeric foam of any density. It should be clearly understood, however, that the foregoing list of suitable foams is purely exemplary and it is fully contemplated that there are any number of other types of foams and/or foam compositions suitable for the uses contemplated herein.

The foam does not have to have any specific formulation or consistency. The foam is generally free of moisture and may contain an incidental amount of impurities, such as felt, fabric, fibers, leather, hair, metal, wood, plastic, and so forth. Preferably, the foam is polyurethane foam with a density similar to the desired density of the subsequently produced bonded foam product. If desired, the foam may be sorted by type and/or density prior to shredding such that foam pieces of similar composition and density are used to make a single foam log. Using foam of similar composition and density to make a single foam log produces a more uniform density throughout the foam log, and thus throughout the subsequently produced bonded foam products, for example, a bonded foam underlayment for a floor covering.

Once the foam for the foam log has been selected, the foam is placed in a shredding machine for shredding 15 in accordance with the method 10. A shredding machine is a machine with a plurality of blades that cut the foam into smaller pieces of foam. The amount of time that the foam spends in the shredding machine determines the size of the shredded pieces of foam. The shredding machine may be operated periodically to provide discrete batches of shredded foam or continuously to provide a continuous supply of shredded foam. An example of a suitable shredding machine is the foam shredder manufactured by the Ormont Corporation. The foam pieces may be a geometric shape, such as round or cubic, but are generally an irregular shape due to the shredding process. The shape of the smaller foam pieces is generally unimportant because the foam will conform to the shape of the mold subsequently used by a molding machine employed to implement 30 of the method 10. The size of the foam pieces should be such that they are large enough to be easily handled by the various machines implementing the method 10, yet small enough such that there is not an abundance of empty space between the foam particles. Preferably, the foam pieces are from about ¼-inch to about ¾-inch in each of length, width, and height dimensions.

While the foam is being shredded by the shredding machine 15, a pre-polymer formed from a blend of plural chemical compounds is mixed 20 in a separate process. It is contemplated that 15 and 20 may, as illustrated herein, be performed generally contemporaneously with one another. However, it is further contemplated that 15 and 20 may instead be performed at separate times. For example, the shredded foam may be stored until the pre-polymer is formed. The pre-polymer would then be used to coat all or part of the stored shredded foam. In the alternative, however, the pre-polymer may be stored, for example, in a holding tank, until a supply of foam is shredded. The pre-polymer may then be used to coat the newly shredded foam.

A first chemical compound used to form part of the pre-polymer is an isocyanate. The isocyanate reacts with the polyol (discussed below) and moisture in the steam (see 35 of method 10) to bind the pieces of foam together. The isocyanate used in the method 10 for making the bonded foam product manufactured with vegetable oil polyol may be any type of isocyanate, such as toluene diisocyanate (TDI), diisocyanatodiphenyl methane (MDI), or blends thereof. Examples of suitable isocyanates include: m-phenylene diisocyanate, p-phenylene diisocyanate, polymethylene polyphenyl-isocyanate, 2,4-toluene diisocyanate, 2,6-toluene diisocyanate, 4,4- diisocyanatodiphenyl methane, dianisidine diisocyanate, bitolylene diisocyanate, naphthalene-1,4-diisocyanate, diphenylene-4,4'-diisocyanate, xylylene-1,4-diisocyanate, xylylene-1,2-diisocyanate, xylylene-1,3-diisocyanate, bis(4-isocyanatophenyl)-methane, bis(3-methyl-4-isocyanatophenyl)-methane, 4,4-diphenylpropane diisocyanate, isophorone diisocyanate, hexamethylene diisocyanate, methylene-bis-cyclohexylisocyanate, and mixtures thereof Of course, it is fully contemplated that the method 10 for making the bonded foam product manufactured with vegetable oil polyol may include other isocyanates suitable for the uses contemplated herein. Accordingly, it should be clearly understood that the specific isocyanates disclosed herein are merely provided by way of example and that isocyanates other than those specifically disclosed herein may be suitable for the uses contemplated herein. The preferred isocyanates are Vomanate T-80 Type I TDI and/or PM 199 MDI, both of which are available from the Dow Corporation. The isocyanate comprises between about 5 percent, by weight, and about 95 percent, by weight, of the total weight of the pre-polymer mixture, preferably between about 17 percent, by weight, and about 37 percent, by weight, of the total weight of the pre-polymer mixture. Most preferably, the isocyanate comprises between about 22 percent, by weight, and about 32 percent, by weight, of the total weight of the pre-polymer mixture.

A second chemical compound used to form part of the pre-polymer is a vegetable oil polyol. The polyol used in the method 10 for making the bonded foam product manufactured with vegetable oil polyol may be any type of vegetable oil polyol, as defined above. The preferred vegetable oil polyol is POLYOL 3000 available from Rutherford Chemicals LLC's CasChem Division. As before, the foregoing vegetable oil polyols are identified for purely exemplary purposes and it is fully contemplated that the method 10 for making the bonded foam product manufactured with vegetable oil polyol may instead include other suitable vegetable oil polyols not specifically disclosed herein. Because of the advantageous properties of the vegetable oil polyol identified above, less vegetable oil polyol is required in the pre-polymer formulation compared with the prior art pre-polymer formulations that utilize petrochemical polyols. The vegetable oil polyol comprises between about 5 percent, by weight, and about 95 percent, by weight, of the total pre-polymer mixture, preferably between about 25 percent, by weight, and about 50 percent, by weight, of the total pre-polymer mixture. Most preferably, the vegetable oil polyol comprises between about 33 percent and about 43 percent, by weight, of the total pre-polymer mixture. By comparison, the prior art pre-polymer formulations typically employ greater than 50 percent petrochemical polyol in the pre-polymer formulation.

In an alternative embodiment, a third chemical compound may be used to form part of the pre-polymer, namely process oil. The process oil lowers the overall viscosity of the pre-polymer solution to facilitate better mixing and distribution of the various components of the pre-polymer. Generally, a viscosity of less than about 1,000 cp is preferred for the herein described bonded foam production operations. A viscosity below 1,000 cp also allows the pre-polymer to uniformly coat the foam pieces so that improved bonding occurs. Accordingly, acceptable process oils have a viscosity below 1,000 cp, preferably below 500 cp, and most preferably below 100 cp, measured at a temperature between 69° F. and about 90° F. The process oil may be any aromatic or non-aromatic, natural or synthetic oil. Examples of suitable process oils include: naphthenic oil, mineral oil, oiticica oil, anthracene oil, synthetic oil, and mixtures thereof, provided such oils have an appropriate viscosity. Of course, the foregoing oils are identified for purely exemplary purposes and it is fully contemplated that the method 10 for making the bonded foam product manufactured with vegetable oil polyol may instead include other suitable oils not specifically disclosed herein. The preferred process oil is Sundex 840 process oil, a process oil available from the Sun Oil Corporation. The process oil comprises between about 5 percent, by weight, and about 95 percent, by weight, of the total weight of the pre-polymer mixture, preferably between about 25 percent, by weight, and about 45 percent, by weight, of the total weight of the pre-polymer mixture. Most preferably, the oil comprises between about 30 percent, by weight, and about 40 percent, by weight, of the total weight of the pre-polymer mixture. Thus, in the most preferred embodiment, the pre-polymer comprises between about 22 percent and about 32 percent of the isocyanate, between about 33 percent and about 43 percent of the vegetable oil polyol, and between about 30 percent and about 40 percent of the process oil for a bonded foam with a density greater than 4 pcf, preferably from about 4 pcf to about 8 pcf. For bonded foam products with a density of less than 4 pcf, such as a density of 3 pcf, the pre-polymer comprises between about 22 percent and about 32 percent of the isocyanate, between about 35 percent and about 45 percent of the vegetable oil polyol, and between about 28 percent and about 38 percent of the process oil.

The pre-polymer may also contain one or more other additives which individually or collectively improve one or more characteristics of the bonded foam product. One example of an additive is a catalyst, which catalyzes the curing process for the pre-polymer. The catalyst may be any amine catalyst, such as a tertiary amine catalyst. Examples of suitable tertiary amine catalysts include: triethylenediamine, tetramethylethylenediamine, bis (2-dimethylaininoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, 2,4,6-tri(dimethylaminomethyl)phenol, N,N',N"-tris(dimethylaminopropyl)-sym-hexahydrotriazine, 2-(2-dimethylaminoethoxy) ethanol,trimethylaminoethylethanolamine, dimorpholinodiethylether (DMDEE), N-methylimidazole, dimethylamino pyridine, dimethylethylethanolamine, and mixtures thereof. Of course, persons of ordinary skill in the art will appreciate that the foregoing tertiary amine catalysts are identified for purely exemplary purposes and it should be clearly understood that the method 10 for making the bonded foam product manufactured with vegetable oil polyol may include catalysts other than those specifically disclosed herein. Preferably, the catalyst is DMDEE, such as the JEF- FCAT® DMDEE catalyst, available from the Huntsman Corporation. The catalyst comprises between about 0.01 percent, by weight, and about 10 percent, by weight, of the total pre-polymer mixture, preferably between about 0.5 percent, by weight, and about 5 percent, by weight, of the total pre-polymer mixture. Most preferably, the catalyst comprises between about 1 percent, by weight, and about 3 percent, by weight, of the total pre-polymer mixture. The addition of DMDEE catalyst to bonded foam underlayment is described in U.S. patent application Ser. No. 11/024,069 entitled "Method for Making a Bonded Foam Product Suitable for Use as an Underlayment for Floor Coverings" filed Dec. 28, 2004 and incorporated herein by reference as if reproduced in its entirety.

The pre-polymer may also contain other additives, such as flame retardants, antimicrobial chemical compounds, antioxidants, and/or dyes. Of the foregoing types of additives, odor absorbing agents, flame retardant chemical compounds, such as melamine, expandable graphite, or dibromoneopentyl glycol, improve the flame retardant properties of the bonded foam product. Antimicrobial additives, such as zinc pyrithione, improve the antimicrobial properties of the bonded foam product. The addition of an antimicrobial chemical compound to a bonded foam product is described in U.S. patent application Ser. No. 10/840,309 entitled "Anti-Microbial Carpet Pad and Method of Making" filed May 6, 2004 and incorporated herein by reference as if reproduced in its entirety. Various antioxidants, which may or may not include butylated hydroxy toluene (BHT) as an ingredient, improve the resistance of the foam to oxidative-type reactions, such as scorch resulting from high exothenmic temperatures. Dyes, such as blue, green, yellow, orange, red, purple, brown, black, white, or gray colored dyes, may be used to create certain color pigments within the bonded foam to distinguish certain bonded foam products from other bonded foam products. The aforementioned additives may alternatively or additionally be present in the scrap foam prior to the addition of the pre-polymer. Of course, it is fully contemplated that the method 10 for making the bonded foam product manufactured with vegetable oil polyol may include other additives for improving these or other characteristics of the bonded foam product and/or enhancing the performance of one or more of 15, 20, 25, 30, 35, 40, 45, and/or 50 of the method 10. Accordingly, it should be clearly understood that the additives disclosed herein are set forth purely by way of example and it is fully contemplated that the method 10 may also include any number of other additives not specifically recited herein.

As previously set forth, the components which collectively form the pre-polymer are combined and mixed 20 in a mixer. It is contemplated that the mixer may either be a dynamic mixer or a static mixer. It is further contemplated that the mixer may either be a batch mixer or a continuous process mixer. Preferably, the mixer is configured to include a tank containing a motorized paddle-type mixing blade. However, it should be fully understood that other types of mixers are suitable for the uses contemplated in the method 10 for making the bonded foam product manufactured with vegetable oil polyol. Accordingly, the method 10 should not be limited to the specific types of mixers disclosed herein. The components which collectively form the pre-polymer may be combined generally simultaneously with one another. Preferably, the components which collectively form the pre-polymer may be added one at a time to the pre-polymer as it is being mixed, starting with the isocyanate, then the polyol, ending with the addition of the process oil. In an embodiment, the temperature of the pre-polymer mixture is maintained from about 90° F. to about 110° F. and mixed for about 10 hours. Preferably, the pre-polymer is mixed until there are about 8 to 10 percent free isocyanates available for reacting with the steam during the steaming process. The mixed pre-polymer has a viscosity less than about 1,000 centipoise, preferably between about 800 and about 100 centipoise, and most preferably between about 400 and about 600 centipoise. The pre-polymer viscosity is measured at a temperature between about 69° F. and about 95° F. Additional process oil may be added to the mixer to modify the viscosity, if necessary. Although the time varies depending on the composition of the pre-polymer, the pre-polymer is mixed for at least about four hours prior to application of the pre-polymer to the foam pieces. Preferably, the isocyanate, the polyol, and the process oil are mixed together for at least about six hours, more preferably at least about 10 hours.

Of course, persons of ordinary skill in the art will appreciate that the vegetable oil polyol can be used as the sole viscosity modification fluid within the pre-polymer, provided that the viscosity of the vegetable oil polyol is less than the desired viscosity (e.g., less than about 1,000 cp) of the pre-polymer. In other words, if the viscosity of the vegetable oil polyol is sufficiently low, then the vegetable oil polyol can be used to modify the viscosity of the pre-polymer instead of the process oil. For example, the castor oil polyol described herein has a viscosity of 400 cp, so it would be suitable for use as a viscosity modification fluid because additional castor oil polyol can be added to the pre-polymer to bring the pre-polymer within the desired viscosity range when the pre-polymer has a viscosity outside the desired range. Conversely, the soy oil polyol described herein has a viscosity of 3,500 cp, and thus would not be suitable for lowering the viscosity of the pre-polymer to the desired viscosity. Persons of ordinary skill in the art will appreciate that the vegetable oil polyol is generally more expensive than the process oil, so the process oil is generally the preferred additive for modifying the viscosity of the pre-polymer.

Figure 2:
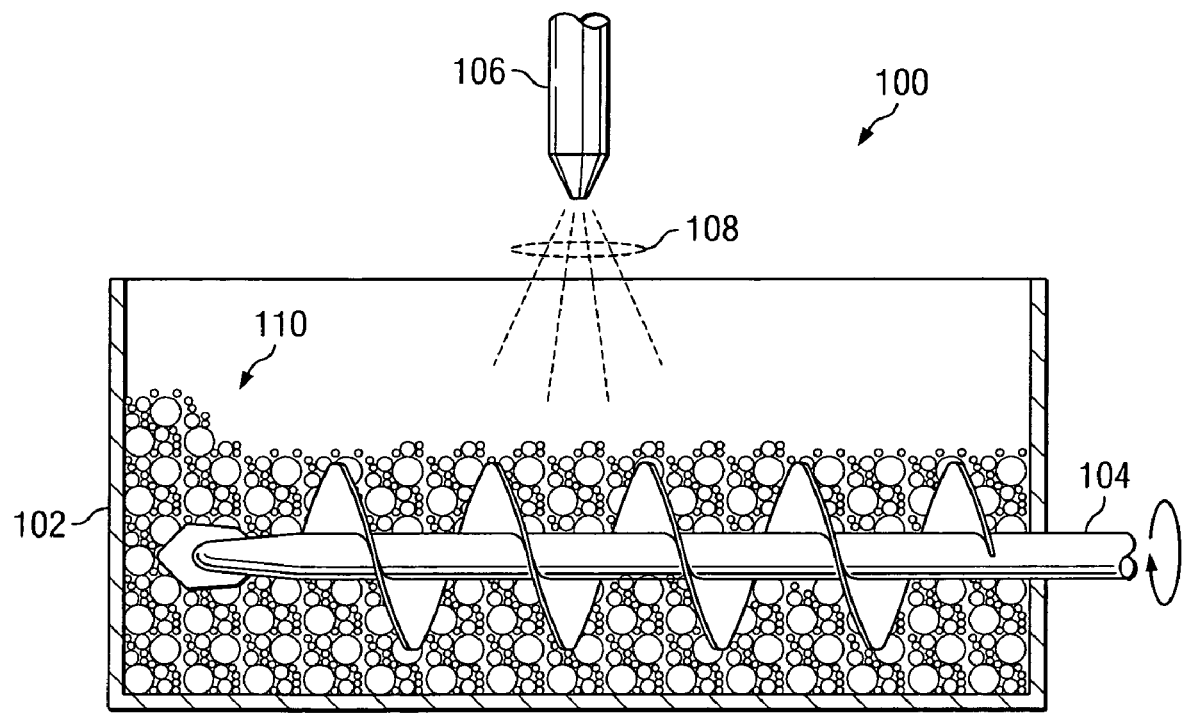
FIG. 2 is a side view of a coating machine suitable for implementing the method for making the bonded foam product manufactured with vegetable oil polyol of FIG. 1.

After the pre-polymer components (isocyanate, polyol, process oil, and any additives) have been suitably mixed 20, the pre-polymer is coated onto the shredded foam pieces 25. The coating machine used to coat the shredded foam pieces may be a batch or a continuous coating machine and may be oriented horizontally, vertically, or at any angle. FIG. 2 is an illustration of a suitable coating machine 100. The coating machine 100 comprises a tank 102, one or more agitators 104, and a pre-polymer applicator 106. The size and shape of the tank 102 may be varied to suit the particular application. Similarly, the number and type of agitators 104 may be varied to suit the particular application. The process of coating the foam pieces 110 begins by placing the foam pieces 110 inside the tank 102. The pre-polymer applicator 106 sprays the pre-polymer 108 onto the foam pieces 110. While the pre-polymer applicator 106 is spraying the foam pieces 110, the agitator 104 rotates relative to the tank 102 and moves the foam pieces 110 around within the tank 102. As the foam pieces 110 move around in the tank 102, the foam pieces 110 are substantially coated with the pre-polymer 108. The time required to substantially coat the foam pieces 110 with the pre-polymer 108 varies depending on the volume and density of the foam pieces 110, the size of the tank 102, and the number and type of agitators 104, but is generally between about 0.5 minutes and about 15 minutes. Preferably, the coating process proceeds for between about 1 minute and about 10 minutes, most preferably between about 1.5 minutes and about 2.5 minutes. Although the pre-polymer 108 is sprayed onto the foam pieces 110 in the coating process illustrated in FIG. 2, the pre-polymer may be applied to the foam pieces by other methods, such as dipping or roller coating. Thus, it is fully contemplated that the method 10 for making the bonded foam product manufactured with vegetable oil polyol includes other types of coating processes and should not be limited to the particular coating process disclosed herein.

Figure 3:
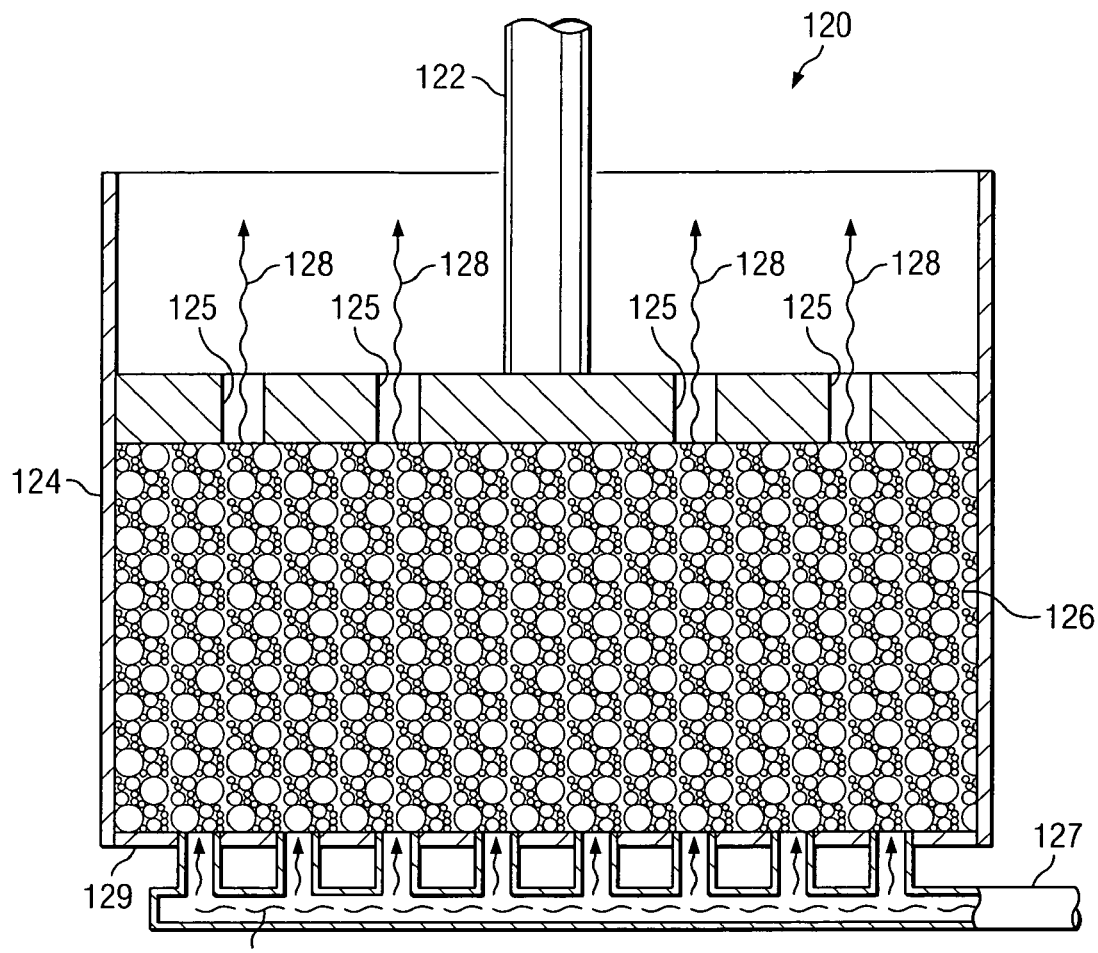
FIG. 3 is a side view of a molding machine suitable for implementing the method for making the bonded foam product manufactured with vegetable oil polyol of FIG. 1.

After the foam pieces have been coated with the pre-polymer 25, the method 10 proceeds to 30 where the foam pieces are transferred to a mold for compression thereof FIG. 3 is an illustration of a typical mold 120 suitable for compressing the foam pieces. The mold 120 comprises a base 129, a generally cylindrical wall 124 detachably coupled to the base 129, a piston 122, a drive system (not shown in FIG. 3), and a steam injection system 127. Under the influence of a force exerted by the drive system, the piston 122 moves vertically with respect to the generally cylindrical wall 124 to a pre-selected position. Thus, the volume of the mold 120 defined by the piston 122, the generally cylindrical wall 124, and the base 129 is known. The piston 122 is configured to be removed from within the wall 124 and positioned away from the remainder of the mold 120 to facilitate easy loading of foam pieces into the cylindrical cavity defined by the base 129 and the generally cylindrical wall 124. Removal of the piston also facilitates the removal of a foam log after the steam process herein below described is complete by allowing the generally cylindrical wall 124 to be detached from the base 129.

When forming a foam log 126, the foam pieces are weighed before being loaded into the mold 120. After the foam pieces are loaded into the mold 120, the piston 122 compresses the foam pieces into a foam log 126. The compression ensures complete contact between the foam pieces in the foam log 126. Because the volume within the mold 120 is known and the weight of the foam pieces can be varied, the density of the foam log 126 can be selected by compressing a variable amount of foam pieces to a specific volume. For example, if the mold volume is 25 cubic feet and the desired density of the foam log is 4 pounds per cubic foot (pcf), then 100 pounds of foam are loaded in the mold 120. The weight of the foam pieces can be varied by loaded more or less foam pieces in the mold 120. The weight of the foam pieces can also be varied by changing the blend of foam pieces. In other words, the foam pieces can contain a mixture of high density foam and low density foam and the ratio of high density foam to low density foam can be varied to yield the appropriate weight of foam pieces. As an alternative method of achieving a desired density, the volume of the mold 120 can be varied for a specified weight of foam pieces. Although a batch-type mold is illustrated in FIG. 3, the foam pieces may be compressed using other compression methods, such as the continuous extruder illustrated in FIG. 5. The compression ratio of the bonded foam product can be expressed as a ratio of the height of the uncompressed foam pieces to the height of the compressed foam pieces for a given cross-sectional area. During the continuous extrusion process, foam pieces (crumbs) are typically compressed at ratios of about 38:28 for 3 pcf foam, about 48:28 for 5.5 pcf foam, and about 52:28 for 8 pcf foam. While a specific compression process is described and illustrated with respect to FIG. 3, it should be clearly understood that the method 10 for making the bonded foam product manufactured with vegetable oil polyol encompasses other types of compression processes and should not be limited to the particular compression process disclosed herein.

Once the foam pieces are compressed 30 into a foam log 126, the method 10 proceeds to 35 where the foam log 126 is steamed to cure the pre-polymer. As seen in FIG. 3, the steam injection system 127 is coupled to a steam supply (not shown) and is configured to inject steam 128 through the base 129, for example, using a pressurized flow of the steam 128. The steam 128 passes through the foam log 126 and any excess steam 128 exits through apertures 125 formed in the piston 122. An inconsequential amount of foam may pass through apertures 125 along with the excess steam 128. The moisture in the steam 128 cures the pre-polymer. The steam 128 may be any steam that is at least about 212° F. and a sufficient pressure to permeate the foam log 126. Preferably, the temperature of the steam is between about 220° F. and about the combustion temperature of the foam (about 1400° F.). The pressure of the steam is preferably between about 10 pounds per square inch gauge (psi) and about 100 psi. Most preferably, the temperature of the steam is between about 246° F. and about 256° F. and the pressure of the steam is between about 13 psi and 15 psi for a batch operation and between about 30 psi and about 45 psi for a continuous operation. The steaming time is dependent on the steam pressure and the density of the foam log. For a 4 pcf foam log and using the most preferred steam, the steam time is between about 0.5 minutes and about 3 minutes, preferably about 1.0 minutes and about 1.5 minutes. For an 8 pcf foam log and using the most preferred steam, the steam time is between about 1.5 minutes and about 5 minutes, preferably about 2 minutes and about 3 minutes. Steam times for foam logs of other densities need not be reproduced herein as such steam times can be readily interpolated or extrapolated from the foregoing steam times and other steam data. While a specific steaming process is described and illustrated with respect to FIG. 3, it should be clearly understood that the method 10 for making the bonded foam product manufactured with vegetable oil polyol encompasses other types of steaming processes and should not be limited to the particular steaming process disclosed herein.

After the steaming process 35 is completed, the method 10 proceeds to 40 where the foam log 126 is removed from the mold 120 and allowed to dry. Here, in order to facilitate the easy unloading of the foam log 126 after the steaming process is complete, it is contemplated that the generally cylindrical wall 124 of the mold 120 is detached from the base 129 after the piston 122 is removed from within the generally cylindrical wall 124 and positioned away from the remainder of the mold 120. The required drying time is dependent on the density of the foam log 126 and the amount of moisture present in the foam log 126. Lower density foam logs 126 may be sufficiently dry to allow immediate processing. However, the foam logs 126 are generally set aside to dry for 12 to 24 hours at ambient temperature and humidity so that foam logs 126 are sufficiently dry such that the moisture in the foam log 126 does not affect any of the processing equipment downstream from the steaming process of step 35. If desired, the drying of the foam log 126 may be sped up by forcing ambient, heated, and/or dried air over or through the foam log 126. While a specific drying process is described herein, it should be clearly understood that the method 10 for making the bonded foam product manufactured with vegetable oil polyol encompasses other drying processes and should not be limited to the particular drying processes disclosed herein.

After the drying process 40 is completed, the method 10 proceeds to 45 where the foam log 126 is cored by drilling an aperture through a center axis thereof. A rod is then inserted into the aperture, thereby enabling the foam log 126 to be handled without damaging the foam. The method 10 then proceeds to 50 where the foam log 126 is transported to a suitably configured peeling machine, such peeling machine 130 illustrated in FIG. 4, for commencement of a peeling process described below.

Figure 4:
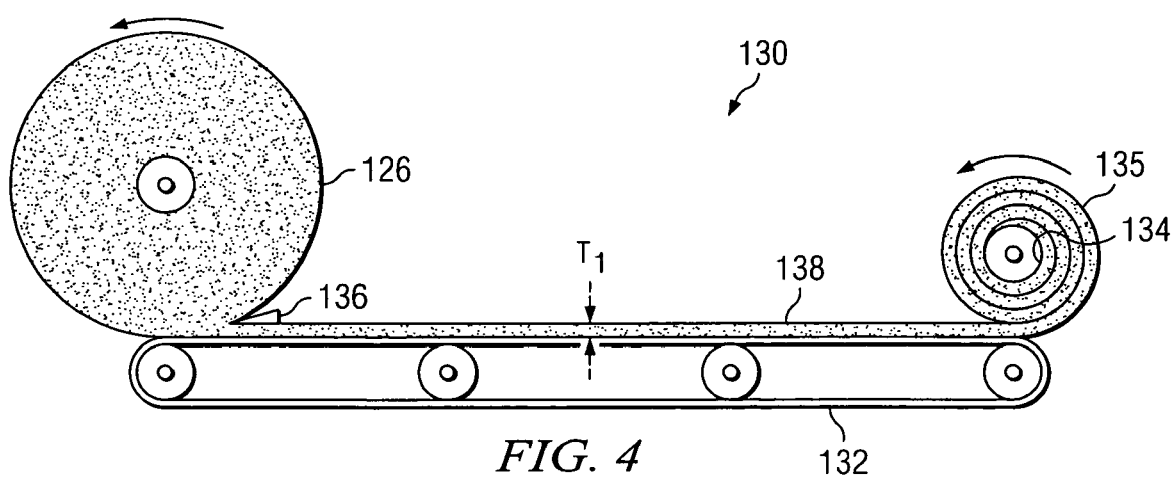
FIG. 4 is a side view of a peeling machine suitable for implementing the method for making the bonded foam product manufactured with vegetable oil polyol of FIG. 1.

As may be seen in FIG. 4, the peeling machine 130 comprises a blade 136, a conveyor 132, and a take-up roll 134. The foam log 126 is rotated against the blade 136 such that the blade peels off a length of a bonded foam product 138 having a desired thickness, $T_1$, and formed from the bonded foam of the foam log 126. The bonded foam product 138 peeled off of the foam log 126 is uniformly thick. As disclosed herein, the bonded foam is continuously peeled off of the foam log 126 at a constant speed. Likewise, the foam log 126 is continuously lowered with respect to the blade 136 at a constant speed. As a result, that the blade 136 constantly peels off a thickness $T_1$ of foam from the foam log 126. In other words, as the diameter of the foam log 126 is reduced, the foam log 126 is lowered so that the bonded foam product 138 has a uniform thickness.

It is contemplated that the bonded foam product 138 formed in the foregoing manner will have a variety of applications, a number of which are not specifically recited herein. One particularly desirable application is the employment of the bonded foam product 138 as a flooring underlayment. A variety of characteristics make the bonded foam product 138 well suited for use as a flooring underlayment, among them, the formation of the bonded foam product 138 in an "endless" length of uniform thickness suitable for rolling. As the length of bonded foam product 138 is transported towards the take-up roll 134 the bonded foam product 138 may also be trimmed to a uniform width, particularly if, after peeling, the bonded foam product 138 is wider than the width desired for the selected application. The bonded foam product 138 continues to travel along the conveyor 132 and is collected on the take-up roll 134, thereby forming roll 135 of the bonded foam product 138. When the roll 135 is of a desired diameter, the bonded foam product 138 is cut along its widthwise dimension to sever the roll 135 from the "endless" length of the bonded foam product 138 which continues to be peeled form the continuing being peeled from the foam log 126. The roll 135 is now ready for transport to distributors, wholesalers, retailers and the like. If desired, the bonded foam product 138 may be cut up into different lengths. For example, the bonded foam product 138 may be cut to a shorter length so that the roll 135 is lighter and easier to handle.

Figure 5:
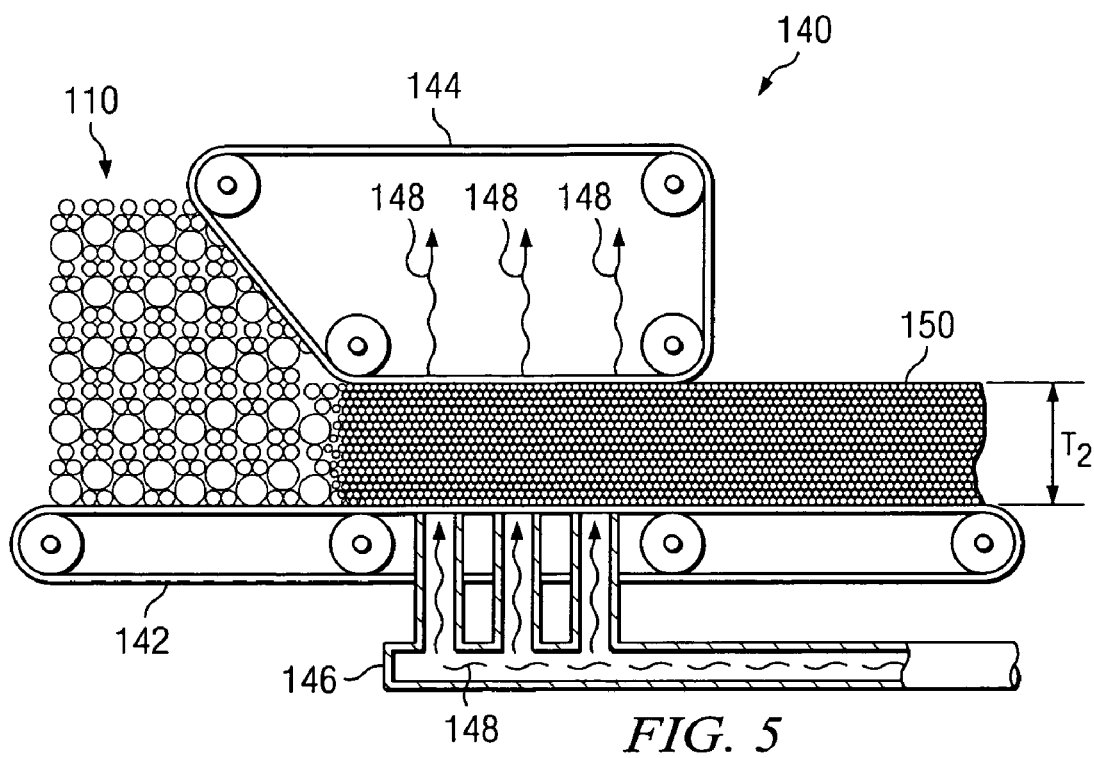
FIG. 5 is a side view of a continuous extruder suitable for implementing the method for making the bonded foam product manufactured with vegetable oil polyol of FIG. 1.

As an alternative to the batch compressing and steaming process described above, the present invention may be utilized in a continuous compressing and molding process. FIG. 5 illustrates a continuous extruder 140 used for continuously compressing and steaming the foam pieces 110 into a continuous foam log 150. The continuous extruder 140 comprises an upper conveyor 144, a lower conveyor 142, and a steam injection system 146. The process of compressing and steaming the foam log 150 begins with the placement of foam pieces 110 onto the lower conveyor 142. Because the density of the foam log 150 produced by the continuous extruder 140 depends on the mass flow rate of the foam pieces 110 through the continuous extruder 140 as well as the volumetric flow rate of the foam log 150 exiting the extruder, the weight of the foam pieces 110 is typically measured prior to placing the foam pieces 110 onto the lower conveyor 142. As the foam pieces 110 travel through the continuous extruder 140, the foam pieces 110 are compressed by the upper conveyor 144. Because the upper conveyor 144 and the lower conveyor 142 travel in the same direction and the foam pieces 110 are continuously entering the continuous extruder 140, the foam pieces 110 are compressed by the downward traveling upper conveyor 144. The height of the upper conveyor 144 over the lower conveyor 142 is adjustable and the density of the foam log 150 can be adjusted by raising and lowering the upper conveyor 142 relative to the lower conveyor 142.

When the foam log is at a desired density, steam 148 is injected into the underside of the foam log 150 through perforations in the lower conveyor 142, with any excess steam passing through the perforations in the upper conveyor 144. The continuous extruder 140 is configured such that the residence time of the foam log 150 in the steaming area of the continuous extruder 140 is equal to the steaming time required in the batch process. The foam log produced by the continuous extruder 140 is generally rectangular in cross section and, as a result, is typically sliced into sheets rather than peeled in the manner described above.

Figure 6:
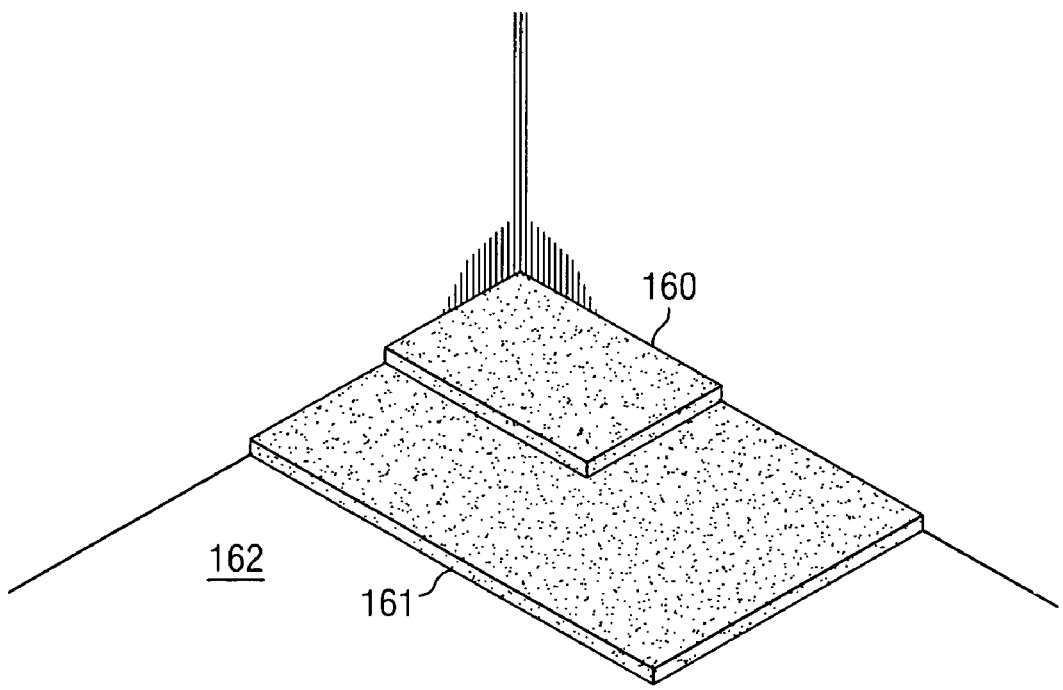
FIG. 6 is a perspective view of a bonded floor covering underlayment which may be made by the method for making the bonded foam product manufactured with vegetable oil polyol of FIG. 1.

FIG. 6 illustrates the application of the roll 135 of the bonded foam product 138 as a flooring underlayment 161 to be installed between a subfloor 162 and a flooring product 160. Typically, the flooring underlayment 161 would be rolled onto the subfloor, cut to size and then covered with the flooring product 160. Of course, the foregoing process would typically include the steps of joining of adjoining sections of flooring underlayment, if necessary, and adhering of the flooring underlayment 161 to the subfloor 162 and/or the flooring 160. The foregoing steps have been omitted, however, purely for ease of description. The flooring underlayment 161 cushions the flooring product 160, smoothes out imperfections in the subfloor 162, reduces sound reflection between the flooring product 160 and the subfloor 162, and if the flooring underlayment 161 is configured with a moisture barrier as discussed below, the flooring underlayment 161 discourages the transmission of moisture between the subfloor 162 and the flooring product 160. The most common use for a flooring underlayment 161 formed from bonded foam is as a carpet pad. Thus it is within the scope of the invention that the flooring product 160 is carpet. However, it is fully contemplated that the flooring underlayment 161 can be used in conjunction with a variety of other flooring products 160. Examples of other flooring products 160 are: wood flooring, laminate flooring, tile flooring, tile adhered to laminate flooring, vinyl flooring, and linoleum flooring. The method 10 for making the bonded foam product manufactured with vegetable oil polyol includes use of the bonded foam product as an underlayment for other flooring products and should not be limited to the specific flooring products disclosed herein.

In an alternative embodiment, a layer of film (not shown) may be added to one or more surfaces of the flooring underlayment 161. The film is a thin layer of material that is adhered or otherwise laminated onto the flooring underlayment 161. The film is made of a material that is impervious to liquid moisture and moisture vapor. Alternatively, the film may be permeable with respect to moisture vapor, but impervious to liquid moisture. Such films are advantageous because they discourage the transmission of liquid moisture across the underlayment yet allow the underlayment to "breathe." Further in the alternative, the film may contain one hydrophobic side and one hydrophilic side. Such films encourage the migration of moisture in one direction, but not the other direction. The film is typically a polymeric film, such as polyethylene or ethylene vinyl acetate (EVA) copolymer. An example of a suitable film is 150 gauge low density polyethylene film weighing 35 grams per square meter, available from numerous manufacturers including Dow® and DuPont®. Of course, a person of ordinary skill in the art will appreciate that a number of other films are commercially available, any one of which may be suitable for the flooring underlayment 161, and that the present invention should not be limited by the specific examples disclosed herein.

EXAMPLE ONE

An experiment was conducted comparing the pre-polymer utilizing a soy oil polyol with the pre-polymer utilizing a petrochemical polyol for both TDI and MDI based pre-polymers. For this experiment, relatively small batches of pre-polymer were prepared using the two polyols and the two isocyanates. The soy oil polyol was Bio Based Agrol 3.0, a soy oil polyol with a functionality of 3.0, a hydroxyl number of 155 mg KOH/g, and a molecular weight of 1,100 g/mol. The soy oil polyol had a garner color of about 2+, an acid value of about 1.2, and about 0.16 percent moisture. The petrochemical polyol was Dow 3512, a polyether based polyol with a functionality of 3.0, a hydroxyl number of 48 mg KOH/g, and a molecular weight of 3,500 g/mol. The TDI was Dow Vomanate T-80 Type I TDI with 48.3 percent free isocyanates. The MDI was Dow PM 199 MDI with 31.9 percent free isocyanates. The isocyanates and polyol were mixed with Sundex 840 process oil, an aromatic process oil available from the Sun Oil Corporation. The results of the comparison are shown below in Tables 1 and 2.

TABLE 1

Comparison of a pre-polymer utilizing TDI and a soy oil polyol with a pre-polymer utilizing TDI and a petrochemical polyol

| | TDI Based Pre-polymer | | | | | |
|---|---|---|---|---|---|---|
| | Soy Pre-polymer Parts | Std. Pre-polymer Parts | Soy Pre-polymer % NCO | Std. Pre-polymer % NCO | Soy Pre-polymer OH # | Std. Pre-polymer OH # |
| Type I TDI Dow Vornanate T-80 | 23 | 25 | 48.3 | 48.3 | | |
| BioBased Soy Polyol | 12 | | | | 155 | |
| Dow 3512 Polyol | | 60 | | | | 56 |
| Sundex 840 Process Oil | 65 | 15 | | | 0 | 0 |
| Totals: | 100 | 100 | 9.7 | 9.6 | | |

| Laboratory Processing | |
|---|---|
| Wt. Ratio of pre-polymer to foam crumbs: | 1:10 |
| Steam time: | 1.5 mins |
| Drying time: | 48 hours |
| Density: | 6.6 pcf |

| Laboratory Viscosities | | |
|---|---|---|
| | BioBased Soy Polyol | Dow Polyol 3512 |
| @ 69 Deg. F. (Initial Pre-polymer Mix): | 70 cp | 750 cp |

TABLE 2

Comparison of a pre-polymer utilizing MDI and a soy oil polyol with a pre-polymer utilizing MDI and a petrochemical polyol

| | MDI Based Pre-polymer | | | | | |
|---|---|---|---|---|---|---|
| | Soy Pre-polymer Parts | Std. Pre-polymer Parts | Soy Pre-polymer % NCO | Std. Pre-polymer % NCO | Soy Pre-polymer OH # | Std. Pre-polymer OH # |
| MDI DOW PM 199 | 33 | 33.3 | 31.9 | 31.9 | | |
| BioBased Soy Polyol | 10 | | | | 155 | |
| Dow 3512 Polyol | | 33.4 | | | | 56 |
| Sundex 840 Process Oil | 57 | 33.3 | | | 0 | 0 |
| Totals: | 100 | 100 | 9.7 | 9.6 | | |

| Laboratory Processing | |
|---|---|
| Wt. Ratio of pre-polymer to foam crumbs: | 1:10 |
| Steam time: | 1.5 mins |
| Drying time: | 48 hours |
| Density: | 6.6 pcf |

| Laboratory Viscosities | | |
|---|---|---|
| | BioBased Soy Polyol | Dow Polyol 3512 |
| @ 72 Deg. F. (Initial Pre-polymer Mix): | 205 cp | 1,100 cp |

The experiment showed that vegetable oil polyol was less expensive than petrochemical polyol, but that the quality of the pre-polymer was better using vegetable oil polyol. Thus, the utilization of vegetable oil polyol in TDI and MDI based pre-polymers for bonded foam products represents an economically viable option.

EXAMPLE TWO

A second, larger scale experiment was conducted comparing the pre-polymers utilizing various different types and blends of vegetable oil polyols. Specifically, the pre-polymer contained TDI and one of the following polyols: soy oil polyol, castor oil polyol, a blend of soy oil polyol and petrochemical polyol, and a blend of castor oil polyol with petrochemical polyol. The viscosities of the samples at various temperatures and times were also measured. As with Example One above, the TDI was Dow Vomanate T-80 Type I TDI, the soy oil polyol was Agrol 3.0, and the petrochemical polyol was Dow 3512, the characteristics of which are described above. The castor oil polyol was CasChem #1 imported castor oil polyol, with a functionality of 2.7, a hydroxyl number of 164 mg KOH/g, and a molecular weight of 928 g/mol. The specific formulation for the pre-polymer with soy oil polyol was 162 pounds of TDI, 168 pounds of soy oil polyol, and 270 pounds of process oil, for a total of 600 pounds. The specific formulation for the pre-polymer with soy oil polyol/petrochemical polyol blend was 150 pounds of TDI, 180 pounds of 50:50 blended soy oil polyol and petrochemical polyol, and 270 pounds of process oil, for a total of 600 pounds. The specific formulation for the pre-polymer with castor oil polyol was 162 pounds of TDI, 162 pounds of castor oil polyol, and 276 pounds of process oil, for a total of 600 pounds. The specific formulation for the pre-polymer with castor oil polyol/petrochemical polyol blend was 150 pounds of TDI, 174 pounds of 50:50 blended castor oil polyol and petrochemical polyol, and 276 pounds of process oil, for a total of 600 pounds. The results of the comparison are shown below in Tables 3 through 6 below.

TABLE 3

Comparison of a pre-polymer utilizing TDI and a soy oil polyol with a pre-polymer utilizing TDI and a petrochemical polyol Soy Pre-polymer

|  | Soy Pre-polymer Parts | Std. Pre-polymer Parts | Soy Pre-polymer % NCO | Std. Pre-polymer % NCO | Soy Pre-polymer OH # | Std. Pre-polymer OH # |
|---|---|---|---|---|---|---|
| Type I TDI Dow Vornanate T-80 | 27 | 25 | 48.3 | 48.3 |  |  |
| BioBased Soy Polyol | 28 |  |  |  | 155 |  |
| Dow 3512 Polyol |  | 60 |  |  |  | 49 |
| Sundex 840 Process Oil | 45 | 15 |  |  | 0 | 0 |
| Totals: | 100 | 100 | 9.8 | 9.9 |  |  |

Laboratory Processing

| Wt. Ratio of pre-polymer to foam crumbs: | 1.1:10.0 |
|---|---|
| Steam time: | 1.5 mins |
| Drying time: | 48 hours |
| Density: | 6.6 pcf |

Laboratory Viscosities

|  | BioBased Soy Polyol | Dow Polyol 3512 |
|---|---|---|
| @ 77 Deg. F. (Unmixed): | 3570 cp | 555 cp |
| @ 69 Deg. F. (Initial Pre-polymer Mix): | 70 cp | 750 cp |
| @ 75 Deg. F. (Initial Pre-polymer Mix): | 50 cp | 400 cp |
| @ 90 Deg. F. Final Pre-polymer Mix (After 6 hours): | 200 cp | 1,100 cp |

TABLE 4

Comparison of a pre-polymer utilizing TDI and a soy oil polyol/petrochemical polyol blend with a pre-polymer utilizing TDI and a petrochemical polyol 50% Soy Pre-polymer

|  | 50% Soy Pre-polymer Parts | Std. Pre-polymer Parts | 50% Soy Pre-polymer % NCO | Std. Pre-polymer % NCO | 50% Soy Pre-polymer OH # | Std. Pre-polymer OH # |
|---|---|---|---|---|---|---|
| Type I TDI Dow Vornanate T-80 | 25 | 25 | 48.3 | 48.3 |  |  |
| BioBased Soy Polyol | 30 |  |  |  | 102 |  |
| Dow 3512 Polyol |  | 60 |  |  |  | 49 |
| Sundex 840 Process Oil | 45 | 15 |  |  | 0 | 0 |
| Totals: | 100 | 100 | 9.8 | 9.6 |  |  |

TABLE 4-continued

Comparison of a pre-polymer utilizing TDI and a soy oil polyol/petrochemical polyol blend with a pre-polymer utilizing TDI and a petrochemical polyol

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | 50% BioBased Soy Polyol | Dow Polyol 3512 |
|---|---|---|
| @ 77 Deg. F. (Unmixed): | 3570 cp | 555 cp |

TABLE 5

Comparison of a pre-polymer utilizing TDI and a castor oil polyol with a pre-polymer utilizing TDI and a petrochemical polyol

Castor Pre-polymer

| | Castor Pre-polymer Parts | Std. Pre-polymer Parts | Castor Pre-polymer % NCO | Std. Pre-polymer % NCO | Castor Pre-polymer OH # | Std. Pre-polymer OH # |
|---|---|---|---|---|---|---|
| Type I TDI Dow Vornanate T-80 | 27 | 25 | 48.3 | 48.3 | | |
| Castor Oil Polyol | 27 | | | | 164 | |
| Dow 3512 Polyol | | 60 | | | | 49 |
| Sundex 840 Process Oil | 46 | 15 | | | 0 | 0 |
| Totals: | 100 | 100 | 9.8 | 9.9 | | |

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | Castor Oil Polyol | Dow Polyol 3512 |
|---|---|---|
| @ 77 Deg. F. (Unmixed): | | 555 cp |
| @ 69 Deg. F. (Initial Pre-polymer Mix): | | 750 cp |

TABLE 6

Comparison of a pre-polymer utilizing TDI and a castor oil polyol/petrochemical polyol blend with a pre-polymer utilizing TDI and a petrochemical polyol

50% Castor Pre-polymer

| | 50% Castor Pre-polymer Parts | Std. Pre-polymer Parts | 50% Castor Pre-polymer % NCO | Std. Pre-polymer % NCO | 50% Castor Pre-polymer OH # | Std. Pre-polymer OH # |
|---|---|---|---|---|---|---|
| Type I TDI Dow Vornanate T-80 | 25 | 25 | 48.3 | 48.3 | | |
| Castor Oil Polyol | 29 | | | | 106.5 | |
| Dow 3512 Polyol | | 60 | | | | 49 |
| Sundex 840 Process Oil | 46 | 15 | | | 0 | 0 |
| Totals: | 100 | 100 | 9.8 | 9.9 | | |

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

TABLE 6-continued

Comparison of a pre-polymer utilizing TDI and a castor oil polyol/petrochemical polyol blend with a pre-polymer utilizing TDI and a petrochemical polyol

| Laboratory Viscosities | 50% Castor Oil Polyol | Dow Polyol 3512 |
|---|---|---|
| @ 77 Deg. F. (Unmixed): | 3570 cp | 555 cp |
| @ 69 Deg. F. (Initial Pre-polymer Mix): | | 750 cp |
| @ 75 Deg. F. (Initial Pre-polymer Mix): | | 400 cp |
| @ 90 Deg. F. Final Pre-polymer Mix (After 6 hours): | | 1,100 cp |

As before, the experiment showed that vegetable oil polyol was less expensive than petrochemical polyol, but that the quality of the pre-polymer was better using vegetable oil polyol. Thus, the utilization of vegetable oil polyol in TDI based pre-polymers for bonded foam products represents an economically viable option.

EXAMPLE THREE

A third experiment was conducted in an effort to optimize the pre-polymer formulations. As with Example Two, the experiment compared the pre-polymers utilizing TDI and one of the following polyols: soy oil polyol, castor oil polyol, a blend of soy oil polyol and petrochemical polyol, and a blend of castor oil polyol with petrochemical polyol. The viscosities of the four samples at various temperatures and times were also measured. As with the preceding examples, the TDI was Dow Vomanate T-80 Type I TDI, the soy oil polyol was Agrol 3.0, the castor oil polyol was CasChem #1 Imported, and the petrochemical polyol was Dow 3512, the characteristics of which are described above. The specific formulation for the pre-polymer with soy oil polyol was 162 pounds of TDI, 168 pounds of soy oil polyol, and 270 pounds of process oil, for a total of 600 pounds. The specific formulation for the pre-polymer with soy oil polyol/petrochemical polyol blend was 150 pounds of TDI, 180 pounds of 50:50 blended soy oil polyol and petrochemical polyol, and 270 pounds of process oil, for a total of 600 pounds. The specific formulation for the pre-polymer with castor oil polyol was 162 pounds of TDI, 258 pounds of castor oil polyol, and 180 pounds of process oil, for a total of 600 pounds. The specific formulation for the pre-polymer with castor oil polyol/petrochemical polyol blend was 150 pounds of TDI, 150 pounds of castor oil polyol, 150 pounds of petrochemical polyol, and 150 pounds of process oil, for a total of 600 pounds. The results of the comparison are shown below in Tables 7 through 10 below.

TABLE 7

Comparison of a pre-polymer utilizing TDI and a soy oil polyol with a pre-polymer utilizing TDI and a petrochemical polyol

| Soy Pre-polymer | | | | | | |
|---|---|---|---|---|---|---|
| | Soy Pre-polymer Parts | Std. Pre-polymer Parts | Soy Pre-polymer % NCO | Std. Pre-polymer % NCO | Soy Pre-polymer OH # | Std. Pre-polymer OH # |
| Type I TDI Dow Vornanate T-80 | 27 | 25 | 48.3 | 48.3 | | |
| BioBased Soy Polyol | 28 | | | | 155 | |
| Dow 3512 Polyol | | 50 | | | | 49 |
| Sundex 840 Process Oil | 45 | 25 | | | 0 | 0 |
| Totals: | 100 | 100 | 9.8 | 10.2 | | |

| Laboratory Processing | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

| Laboratory Viscosities | BioBased Soy Polyol | Dow Polyol 3512 |
|---|---|---|
| @ 77 Deg. F. (Unmixed): | 3570 cp | 555 cp |
| @ 69 Deg. F. (Initial Pre-polymer Mix): | 70 cp | 750 cp |
| @ 75 Deg. F. (Initial Pre-polymer Mix): | 50 cp | 400 cp |
| @ 90 Deg. F. Final Pre-polymer Mix (After 6 hours): | 200 cp | 1,100 cp |

TABLE 8

Comparison of a pre-polymer utilizing TDI and a soy oil polyol/petrochemical polyol blend with a pre-polymer utilizing TDI and a petrochemical polyol

| | 50% Soy Pre-polymer Parts | Std. Pre-polymer Parts | 50% Soy Pre-polymer % NCO | Std. Pre-polymer % NCO | 50% Soy Pre-polymer OH # | Std. Pre-polymer OH # |
|---|---|---|---|---|---|---|
| Type I TDI Dow Vornanate T-80 | 27 | 25 | 48.3 | 48.3 | | |
| BioBased Soy Polyol | 28 | | | | 102 | |
| Dow 3512 Polyol | | 50 | | | | 49 |
| Sundex 840 Process Oil | 45 | 25 | | | 0 | 0 |
| Totals: | 100 | 100 | 9.8 | 10.2 | | |

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | 50% BioBased Soy Polyol | Dow Polyol 3512 |
|---|---|---|
| @ 77 Deg. F. (Unmixed): | 3570 cp | 555 cp |

TABLE 9

Comparison of a pre-polymer utilizing TDI and a castor oil polyol with a pre-polymer utilizing TDI and a petrochemical polyol

| | Castor Pre-polymer Parts | Std. Pre-polymer Parts | Castor Pre-polymer % NCO | Std. Pre-polymer % NCO | Castor Pre-polymer OH # | Std. Pre-polymer OH # |
|---|---|---|---|---|---|---|
| Type I TDI Dow Vornanate T-80 | 27 | 25 | 48.3 | 48.3 | | |
| Castor Oil Polyol | 43 | | | | 164 | |
| Dow 3512 Polyol | | 50 | | | | 49 |
| Sundex 840 Process Oil | 30 | 25 | | | 0 | 0 |
| Totals: | 100 | 100 | 7.8 | 10.2 | | |

Laboratory Processing

| | |
|---|---|
| Wt. Ratio of pre-polymer to foam crumbs: | 1:10.0 |
| Steam time: | 1.5 mins |
| Drying time: | 48 hours |
| Density: | 6.6 pcf |

Laboratory Viscosities

| | Castor Oil Polyol | Dow Polyol 3512 |
|---|---|---|
| @ 77 Deg. F. (Unmixed): | 400 cp | 555 cp |
| @ 69 Deg. F. (Initial Pre-polymer Mix): | | |
| @ 75 Deg. F. (Initial Pre-polymer Mix): | 50 cp | 30 cp |
| @ 90 Deg. F. Final Pre-polymer Mix (After 6 hours): | 720 cp | 50 cp |
| @ 72 Deg. F. Final Pre-polymer Mix (After 60 hours): | 2,470 cp | |
| @ 90 Deg. F. Final Pre-polymer Mix (After 60 hours): | 710 cp | |

TABLE 10

Comparison of a pre-polymer utilizing TDI and a castor oil polyol/petrochemical polyol blend with a pre-polymer utilizing TDI and a petrochemical polyol

| | 50% Castor Pre-polymer | | | | | |
|---|---|---|---|---|---|---|
| | 50% Castor Pre-polymer Parts | Std. Pre-polymer Parts | 50% Castor Pre-polymer % NCO | Std. Pre-polymer % NCO | 50% Castor Pre-polymer OH # | Std. Pre-polymer OH # |
| Type I TDI Dow Vornanate T-80 | 25 | 25 | 48.3 | 48.3 | | |
| Castor Oil Polyol | 25 | | | | 106.5 | |
| Dow 3512 Polyol | 25 | 50 | | | | 49 |
| Sundex 840 Process Oil | 25 | 25 | | | 0 | 0 |
| Totals: | 100 | 100 | 8.1 | 10.2 | | |

| Laboratory Processing | |
|---|---|
| Wt. Ratio of pre-polymer to foam crumbs: | 1:10.0 |
| Steam time: | 1.5 mins |
| Drying time: | 48 hours |
| Density: | 13.4 pcf |

| Laboratory Viscosities | | |
|---|---|---|
| | 50% Castor Oil Polyol | Dow Polyol 3512 |
| @ 77 Deg. F. (Unmixed): | 400 cp | 555 cp |
| @ 69 Deg. F. (Initial Pre-polymer Mix): | | 750 cp |
| @ 75 Deg. F. (Initial Pre-polymer Mix): | 70 cp | 30 cp |
| @ 90 Deg. F. Final Pre-polymer Mix (After 6 hours): | 890 cp | 50 cp |

As before, the experiment showed that vegetable oil polyol was less expensive than petrochemical polyol, but that the quality of the pre-polymer was better using vegetable oil polyol. Thus, the utilization of vegetable oil polyol in TDI based pre-polymers for bonded foam products represents an economically viable option.

EXAMPLE FOUR

A fourth experiment was conducted in an effort to further optimize the pre-polymer formulations. As with Example Two and Three, the experiment compared the pre-polymers utilizing TDI and one of the following polyols: soy oil polyol, castor oil polyol, a blend of soy oil polyol and petrochemical polyol, and a blend of castor oil polyol with petrochemical polyol. The viscosities of the four samples at various temperatures and times were also measured. As with the preceding examples, the TDI was Dow Vomanate T-80 Type I TDI, the soy oil polyol was Agrol 3.0, the castor oil polyol was CasChem #1 Imported, and the petrochemical polyol was Dow 3512, the characteristics of which are described above. The specific formulation for the pre-polymer with soy oil polyol was 162 pounds of TDI, 168 pounds of soy oil polyol, and 270 pounds of process oil, for a total of 600 pounds. The specific formulation for the pre-polymer with soy oil polyol/petrochemical polyol blend was 150 pounds of TDI, 180 pounds of 50:50 blended soy oil polyol and petrochemical polyol, and 270 pounds of process oil, for a total of 600 pounds. The specific formulation for the pre-polymer with castor oil polyol was 162 pounds of TDI, 210 pounds of castor oil polyol, and 228 pounds of process oil, for a total of 600 pounds. The specific formulation for the pre-polymer with castor oil polyol/petrochemical polyol blend was 150 pounds of TDI, 1740 pounds of castor oil polyol/petrochemical polyol blend, and 276 pounds of process oil, for a total of 600 pounds. The results of the comparison are shown below in Tables 11 through 14 below.

TABLE 11

Comparison of a pre-polymer utilizing TDI and a soy oil polyol with a pre-polymer utilizing TDI and a petrochemical polyol

| | Soy Pre-polymer | | | | | |
|---|---|---|---|---|---|---|
| | Soy Pre-polymer Parts | Std. Pre-polymer Parts | Soy Pre-polymer % NCO | Std. Pre-polymer % NCO | Soy Pre-polymer OH # | Std. Pre-polymer OH # |
| Type I TDI Dow Vornanate T-80 | 27 | 25 | 48.3 | 48.3 | | |
| BioBased Soy Polyol | 28 | | | | 155 | |
| Dow 3512 Polyol | | 50 | | | | 49 |
| Sundex 840 Process Oil | 45 | 25 | | | 0 | 0 |
| Totals: | 100 | 100 | 9.8 | 10.2 | | |

TABLE 11-continued

Comparison of a pre-polymer utilizing TDI and a soy oil polyol
with a pre-polymer utilizing TDI and a petrochemical polyol

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | BioBased Soy Polyol | Dow Polyol 3512 |
|---|---|---|
| @ 77 Deg. F. (Unmixed): | 3570 cp | 555 cp |
| @ 69 Deg. F. (Initial Pre-polymer Mix): | 70 cp | 750 cp |
| @ 75 Deg. F. (Initial Pre-polymer Mix): | 50 cp | 400 cp |
| @ 90 Deg. F. Final Pre-polymer Mix (After 6 hours): | 200 cp | 1,100 cp |

TABLE 12

Comparison of a pre-polymer utilizing TDI and a soy oil polyol/petrochemical polyol blend with a pre-polymer utilizing TDI and a petrochemical polyol

50% Soy Pre-polymer

| | 50% Soy Pre-polymer Parts | Std. Pre-polymer Parts | 50% Soy Pre-polymer % NCO | Std. Pre-polymer % NCO | 50% Soy Pre-polymer OH # | Std. Pre-polymer OH # |
|---|---|---|---|---|---|---|
| Type I TDI Dow Vornanate T-80 | 25 | 25 | 48.3 | 48.3 | | |
| BioBased Soy Polyol | 30 | | | | 102 | |
| Dow 3512 Polyol | | 50 | | | | 49 |
| Sundex 840 Process Oil | 45 | 25 | | | 0 | 0 |
| Totals: | 100 | 100 | 9.8 | 10.2 | | |

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | 50% BioBased Soy Polyol | Dow Polyol 3512 |
|---|---|---|
| @ 77 Deg. F. (Unmixed): | 3570 cp | 555 cp |

TABLE 13

Comparison of a pre-polymer utilizing TDI and a castor oil polyol
with a pre-polymer utilizing TDI and a petrochemical polyol

Castor Pre-polymer

| | Castor Pre-polymer Parts | Std. Pre-polymer Parts | Castor Pre-polymer % NCO | Std. Pre-polymer % NCO | Castor Pre-polymer OH # | Std. Pre-polymer OH # |
|---|---|---|---|---|---|---|
| Type I TDI Dow Vornanate T-80 | 27 | 25 | 48.3 | 48.3 | | |
| Castor Oil Polyol | 35 | | | | 164 | |
| Dow 3512 Polyol | | 50 | | | | 49 |
| Sundex 840 Process Oil | 38 | 25 | | | 0 | 0 |
| Totals: | 100 | 100 | 8.7 | 10.2 | | |

TABLE 13-continued

Comparison of a pre-polymer utilizing TDI and a castor oil polyol
with a pre-polymer utilizing TDI and a petrochemical polyol

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | Castor Oil Polyol | Dow Polyol 3512 |
|---|---|---|
| @ 77 Deg. F. (Unmixed): | 400 cp | 555 cp |
| @ 75 Deg. F. (Initial Pre-polymer Mix): | 30 cp | 30 cp |
| @ 90 Deg. F. Final Pre-polymer Mix (After 6 hours): | 150 cp | 50 cp |

TABLE 14

Comparison of a pre-polymer utilizing TDI and a castor oil polyol/petrochemical
polyol blend with a pre-polymer utilizing TDI and a petrochemical polyol

50% Castor Pre-polymer

| | 50% Castor Pre-polymer Parts | Std. Pre-polymer Parts | 50% Castor Pre-polymer % NCO | Std. Pre-polymer % NCO | 50% Castor Pre-polymer OH # | Std. Pre-polymer OH # |
|---|---|---|---|---|---|---|
| Type I TDI Dow Vornanate T-80 | 25 | 25 | 48.3 | 48.3 | | |
| Castor Oil Polyol | 29 | | | | 106.5 | |
| Dow 3512 Polyol | | 50 | | | | 49 |
| Sundex 840 Process Oil | 46 | 25 | | | 0 | 0 |
| Totals: | 100 | 100 | 9.8 | 9.9 | | |

Laboratory Processing

| | |
|---|---|
| Wt. Ratio of pre-polymer to foam crumbs: | 1.1:10.0 |
| Steam time: | 1.5 mins |
| Drying time: | 48 hours |
| Density: | 6.6 pcf |

Laboratory Viscosities

| | 50% Castor Oil Polyol | Dow Polyol 3512 |
|---|---|---|
| @ 77 Deg. F. (Unmixed): | | 555 cp |
| @ 69 Deg. F. (Initial Pre-polymer Mix): | | 750 cp |

As before, the experiment showed that vegetable oil polyol was less expensive than petrochemical polyol, but that the quality of the pre-polymer was better using vegetable oil polyol. Thus, the utilization of vegetable oil polyol in TDI based pre-polymers for bonded foam products represents an economically viable option.

EXAMPLE FIVE

Pre-polymer prepared in accordance with castor oil polyol and soy oil polyol pre-polymer formulations illustrated in Example Four was used to created bonded foam logs using the aforementioned process. Physical testing of the 6 pcf samples showed that the castor oil polyol and the soy oil polyol pre-polymer formulations produced acceptable pad compared to the petrochemical polyol pre-polymer formulation. Center cut samples of the castor oil polyol and the soy oil polyol pre-polymer formulations showed very similar test results on all parameters when compared with the petrochemical polyol pre-polymer formulation. For example, bonded foam carpet underlayment produced using the petrochemical polyol pre-polymer formulation had a density of 6.6 pcf, CFD of 4.4 lbs, a compression set of 16.3 percent, a tensile strength of 9.9 lbs, and an elongation of 32.2 percent. By comparison, bonded foam carpet underlayment produced using the castor oil polyol pre-polymer formulation had a density of 6.3 pcf, a CFD of 4.7 lbs, a compression set of 14.2 percent, a tensile strength of 11.7 lbs, and an elongation of 31.7 percent. Similarly, bonded foam carpet underlayment produced using the soy oil polyol pre-polymer formulation had a density of 6.2 pcf, a CFD of 4.8 lbs, a compression set of 16.6 percent, and a tensile strength of 9.5 lbs. Overall, the bonded foam carpet underlayment produced using the castor oil polyol pre-polymer formulation had the greatest number of physical parameters that exceeded standard. A slight (0.5 percent) decrease in elongation was noted but was not deemed significant. Bonded foam produced using castor oil polyol and soy oil polyol pre-polymer formulations exhibited weaker adhesive strength as to the crumbs exiting the extruder onto the conveyor after steaming (e.g., in the continuous process described above), as measured by hand compression, than foam product produced using the petrochemical polyol pre-polymer formulation. However, after forced drying and curing for three hours, no problem remained and the bonded foam product could be slit and rolled up without any processing problems.

EXAMPLE SIX

A fifth experiment was conducted using two different pre-polymer formulations of TDI, castor oil polyol, and process oil. The laboratory tested the test samples for compression sets, compression force deflection (CFD), tensile strength, elongation, and density. The compression sets were tested in accordance with ASTM D-3574D-95. The CFD was tested in accordance with ASTM D-3574C-95. The tensile strength and elongation were tested in accordance with ASTM D-3574E-95. Finally, the density was tested in accordance with ASTM D-3574A-95. Tables 15 and 16 are the physical property test comparison results for bonded foam underlayment with a density of 6 pcf produced using the two castor oil polyol pre-polymer formulation. More specifically, Table 15 shows the physical properties of a bonded foam underlayment produced using a pre-polymer containing 27 percent TDI, 35 percent castor oil polyol, and 38 percent process oil. Table 16 shows the physical properties of a bonded foam underlayment produced using a pre-polymer containing 27 percent TDI, 43 percent castor oil polyol, and 30 percent process oil. The 27/35/38 pre-polymer formulation was used to produce 5 buns and the 27/43/30 pre-polymer formulation was used to produce 3 buns. The 27/35/38 pre-polymer formulation was calculated to have an 8.7 percent free isocyanate content after mixing for approximately 7 hours with a final pre-polymer formulation to crumb weight ratio of 8.98 percent. To compare the physical properties of the bonded foam underlayment produced using the petrochemical polyol pre-polymer formulation to bonded foam underlayment produced using the two castor oil polyol pre-polymer formulations, the samples were tested without back netting or any other type of physical reinforcement to eliminate any possible influence of the netting in reinforcing the pad.

TABLE 15

Physical properties of a pre-polymer consisting of 27 percent TDI, 35 percent castor oil polyol, and 38 percent process oil
Castor Oil Polyol Pre-polymer Physical Property Comparative Analysis (without netting reinforcement)

| Cut Position | Std. | Test | Diff. | Std. | Test | Diff. | Std. | Test Left | Diff. | Std. | Test | Diff. | Std. | Test | Diff. |
|---|---|---|---|---|---|---|---|---|---|---|---|---|---|---|---|
| | | Density | | | CFD | | | Elongation | | | Tensile | | | Comp. Set | |
| Top | | 6.27 | | | 4.35 | | | 37.18 | | | 5.55 | | | 16.63 | |
| Middle | 5.88 | 5.93 | 0.05 | 5.13 | 6.33 | 1.20 | 34.53 | 43.26 | 8.73 | 2.95 | 6.17 | 3.22 | 15.12 | 15.16 | 0.04 |
| Bottom | | 6.18 | | | 4.68 | | | 32.47 | | | 5.46 | | | 12.94 | |
| Avg. | | 6.13 | | | 5.12 | | | 37.64 | | | 5.73 | | | 14.91 | |
| High | | 6.27 | | | 6.33 | | | 43.26 | | | 6.17 | | | 16.63 | |
| Low | | 5.93 | | | 4.35 | | | 32.47 | | | 5.46 | | | 12.94 | |
| Range | | 0.34 | | | 1.98 | | | 10.79 | | | 0.71 | | | 3.69 | |

| Cut Position | Std. | Test | Diff. | Std. | Test | Diff. | Std. | Test Center | Diff. | Std. | Test | Diff. | Std. | Test | Diff. |
|---|---|---|---|---|---|---|---|---|---|---|---|---|---|---|---|
| | | Density | | | CFD | | | Elongation | | | Tensile | | | Comp. Set | |
| Top | | 6.24 | | | 5.33 | | | 40.24 | | | 2.62 | | | 16.79 | |
| Middle | 6.14 | 6.12 | (0.02) | 5.25 | 5.68 | 0.43 | 33.79 | 28.76 | (5.03) | 3.02 | 3.33 | 0.31 | 14.52 | 13.00 | (1.52) |
| Bottom | | 6.35 | | | 6.00 | | | 40.47 | | | 5.00 | | | 14.11 | |
| Avg. | | 6.24 | | | 5.67 | | | 36.49 | | | 3.65 | | | 14.63 | |
| High | | 6.35 | | | 6.00 | | | 40.47 | | | 5.00 | | | 16.79 | |
| Low | | 6.12 | | | 5.33 | | | 28.76 | | | 2.62 | | | 13.00 | |
| Range | | 0.23 | | | 0.67 | | | 11.71 | | | 2.38 | | | 3.79 | |

| Cut Position | Std. | Test | Diff. | Std. | Test | Diff. | Std. | Test Right | Diff. | Std. | Test | Diff. | Std. | Test | Diff. |
|---|---|---|---|---|---|---|---|---|---|---|---|---|---|---|---|
| | | Density | | | CFD | | | Elongation | | | Tensile | | | Comp. Set | |
| Top | | 5.83 | | | 4.33 | | | 35.29 | | | 4.27 | | | 17.02 | |
| Middle | 6.02 | 6.01 | (0.01) | 5.33 | 5.05 | (0.28) | 35.68 | 40.29 | 4.61 | 3.42 | 4.12 | 0.70 | 14.22 | 14.38 | 0.16 |
| Bottom | | 6.02 | | | 4.95 | | | 43.26 | | | 4.15 | | | 13.45 | |
| Avg. | | 5.95 | | | 4.78 | | | 39.61 | | | 4.18 | | | 14.95 | |
| High | | 6.02 | | | 5.05 | | | 43.26 | | | 4.27 | | | 17.02 | |
| Low | | 5.83 | | | 4.33 | | | 35.29 | | | 4.12 | | | 13.45 | |
| Range | | 0.19 | | | 0.72 | | | 7.97 | | | 0.15 | | | 3.57 | |

TABLE 15-continued

Physical properties of a pre-polymer consisting of 27 percent TDI, 35 percent castor oil polyol,
and 38 percent process oil
Castor Oil Polyol Pre-polymer Physical Property Comparative Analysis (without netting reinforcement)

Composite Comparison:

| | \multicolumn{15}{c}{Sample:} |
|---|---|---|---|---|---|---|---|---|---|---|---|---|---|---|---|
| | Std. | Test | Diff. | Std. | Test | Diff. | Std. | Test | Diff. | Std. | Test | Diff. | Std. | Test | Diff. |
| | | Density | | | CFD | | | Elongation | | | Tensile | | | Comp. Set | |
| Avg. | 6.01 | 6.11 | 0.09 | 5.24 | 5.19 | (0.05) | 34.67 | 37.91 | 3.25 | 3.13 | 4.52 | 1.39 | 14.62 | 14.83 | 0.21 |
| High | 6.14 | 6.35 | 0.21 | 5.33 | 6.33 | 1.00 | 35.68 | 43.26 | 7.58 | 3.42 | 6.17 | 2.75 | 15.12 | 17.02 | 1.90 |
| Low | 5.88 | 5.83 | (0.05) | 5.13 | 4.33 | (0.80) | 33.79 | 28.76 | (5.03) | 2.95 | 2.62 | (0.33) | 14.22 | 12.94 | (1.28) |
| Range | 0.26 | 0.52 | 0.26 | 0.20 | 2.00 | 1.80 | 1.89 | 14.50 | 12.61 | 0.47 | 3.55 | 3.08 | 0.90 | 4.08 | 3.18 |
| Std. Dev. | 0.13 | 0.17 | 0.04 | 0.10 | 0.71 | 0.61 | 0.95 | 4.94 | 3.99 | 0.25 | 1.13 | 0.88 | 0.46 | 1.64 | 1.18 |
| Number of Samples | 3 | 9 | | 3 | 9 | | 3 | 9 | | 3 | 9 | | 3 | 9 | |

TABLE 16

Physical properties of a pre-polymer consisting of 27 percent TDI, 43 percent castor oil polyol,
and 30 percent process oil
Castor Oil Polyol Pre-polymer Physical Property Comparative Analysis (without netting reinforcement)

| | | | | | | | Sample: | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| | | | | | | | | Left | | | | | | | |
| Position | | Density | | | CFD | | | Elongation | | | Tensile | | | Comp. Set | |
| Top | | 5.94 | | | 5.03 | | | 42.56 | | | 4.15 | | | 14.02 | |
| Middle | 5.88 | 5.87 | (0.01) | 5.13 | 5.33 | 0.20 | 34.53 | 46.00 | 11.47 | 2.95 | 6.33 | 3.38 | 15.12 | 15.36 | 0.24 |
| Bottom | | 6.01 | | | 4.78 | | | 35.59 | | | 3.49 | | | 12.43 | |
| Avg. | | 5.94 | | | 5.05 | | | 41.38 | | | 4.66 | | | 13.94 | |
| High | | 6.01 | | | 5.33 | | | 46.00 | | | 6.33 | | | 15.36 | |
| Low | | 5.87 | | | 4.78 | | | 35.59 | | | 3.49 | | | 12.43 | |
| Range | | 0.14 | | | 0.55 | | | 10.41 | | | 2.84 | | | 2.93 | |

| | | | | | | | Sample: | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| | | | | | | | | Center | | | | | | | |
| Position | | Density | | | CFD | | | Elongation | | | Tensile | | | Comp. Set | |
| Top | | 6.10 | | | 4.43 | | | 37.38 | | | 4.35 | | | 15.22 | |
| Middle | 6.14 | 5.99 | (0.15) | 5.25 | 4.68 | (0.57) | 33.79 | 40.35 | 6.56 | 3.02 | 3.39 | 0.37 | 14.52 | 14.29 | (0.23) |
| Bottom | | 6.32 | | | 4.75 | | | 41.06 | | | 4.26 | | | 14.04 | |
| Avg. | | 6.14 | | | 4.62 | | | 39.60 | | | 4.00 | | | 14.52 | |
| High | | 6.32 | | | 4.75 | | | 41.06 | | | 4.35 | | | 15.22 | |
| Low | | 5.99 | | | 4.43 | | | 37.38 | | | 3.39 | | | 14.04 | |
| Range | | 0.33 | | | 0.32 | | | 3.68 | | | 0.96 | | | 1.18 | |

| | | | | | | | Sample: | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| | | | | | | | | Right | | | | | | | |
| Position | | Density | | | CFD | | | Elongation | | | Tensile | | | Comp. Set | |
| Top | | 6.20 | | | 4.15 | | | 40.68 | | | 6.81 | | | 13.77 | |
| Middle | 6.02 | 5.92 | (0.10) | 5.33 | 4.38 | (0.95) | 35.68 | 32.56 | (3.12) | 3.42 | 4.29 | 0.87 | 14.22 | 14.04 | (0.18) |
| Bottom | | 6.11 | | | 4.33 | | | 39.74 | | | 3.42 | | | 14.26 | |
| Avg. | | 6.08 | | | 4.29 | | | 37.66 | | | 4.84 | | | 14.02 | |
| High | | 6.20 | | | 4.38 | | | 40.68 | | | 6.81 | | | 14.26 | |
| Low | | 5.92 | | | 4.15 | | | 32.56 | | | 3.42 | | | 13.77 | |
| Range | | 0.28 | | | 0.23 | | | 8.12 | | | 3.39 | | | 0.49 | |

TABLE 16-continued

Physical properties of a pre-polymer consisting of 27 percent TDI, 43 percent castor oil polyol, and 30 percent process oil
Castor Oil Polyol Pre-polymer Physical Property Comparative Analysis (without netting reinforcement)

Composite Comparison:

Sample:

|  | Std. Density | Test Density | Diff. | Std. CFD | Test CFD | Diff. | Std. Elongation | Test Elongation | Diff. | Std. Tensile | Test Tensile | Diff. | Std. Comp. Set | Test Comp. Set | Diff. |
|---|---|---|---|---|---|---|---|---|---|---|---|---|---|---|---|
| Avg. | 6.01 | 6.05 | 0.04 | 5.24 | 4.65 | (0.59) | 34.67 | 39.55 | 4.88 | 3.13 | 4.50 | 1.37 | 14.62 | 14.16 | (0.46) |
| High | 6.14 | 6.32 | 0.18 | 5.33 | 5.33 | 0.00 | 35.68 | 46.00 | 10.32 | 3.42 | 6.81 | 3.39 | 15.12 | 15.36 | 0.24 |
| Low | 5.88 | 5.87 | (0.01) | 5.13 | 4.15 | (0.98) | 33.79 | 32.56 | (1.23) | 2.95 | 3.39 | 0.44 | 14.22 | 12.43 | (1.79) |
| Range | 0.26 | 0.45 | 0.19 | 0.20 | 1.18 | 0.98 | 1.89 | 13.44 | 11.55 | 0.47 | 3.42 | 2.95 | 0.90 | 2.93 | 2.03 |
| Std. Dev. | 0.13 | 0.14 | 0.01 | 0.10 | 0.37 | 0.27 | 0.95 | 3.94 | 2.99 | 0.25 | 1.24 | 0.99 | 0.46 | 0.85 | 0.39 |
| Number of Samples | 3 | 9 | | 3 | 9 | | 3 | 9 | | 3 | 9 | | 3 | 9 | |

During processing, the only notable difference in feel between the bonded foam produced using the petrochemical polyol pre-polymer formulation and the bonded foam produced using the two castor oil polyol pre-polymer formulations was a slightly lower hand strength exiting steaming on the conveyor for the bonded foam produced using the two castor oil polyol pre-polymer formulations. This difference, however, did not influence downstream processing like drying, curing, and slitting into finished bonded foam underlayment. There were not any processing problems despite the lower hand strength because the post steaming cure rate of both castor oil pre-polymer formulations were much more rapid than the petrochemical polyol pre-polymer formulation, which resulted in very good comparable physical properties.

Looking at the average composite data from all of the samples, the 27/35/38 pre-polymer formulation produced pad that had improved physical properties compared to standard for percent elongation and tensile strength. Compression set, CFD, and density were not significantly different than the bonded product produced using the petrochemical polyol. The 27/43/30 pre-polymer formulation also had improved percent elongation and tensile strengths compared to the petrochemical polyol pre-polymer formulation, but had slightly lower CFD and compression sets. The best physical property results came from the 27/35/38 pre-polymer formulation. Interestingly, this blend ratio was also the lowest cost due to less castor oil polyol needed in the pre-polymer formulation to achieve the best physical properties. It is projected that the utilization of the 27/35/38 pre-polymer formulation will result in a reduction of the cost of the pre-polymer by about 20 percent without any substantial decrease in physical properties.

EXAMPLE SEVEN

A sixth experiment was conducted using a different pre-polymer formulation of TDI, castor oil polyol, and process oil. The laboratory tested the test samples for compression sets, compression force deflection (CFD), tensile strength, elongation, and density. The compression sets were tested in accordance with ASTM D-3574D-95. The CFD was tested in accordance with ASTM D-3574C-95. The tensile strength and elongation were tested in accordance with ASTM D-3574E-95. Finally, the density was tested in accordance with ASTM D-3574A-95. Table 17 is the pre-polymer formulation for the sixth experiment. Tables 18 and 19 are the physical property test comparison results for bonded foam underlayment with a density of 5 pcf produced using the castor oil polyol pre-polymer formulation. More specifically, Table 18 shows the physical properties of a bonded foam underlayment produced using a pre-polymer containing 27 percent TDI, 38 percent castor oil polyol, and 35 percent process oil, and combined with the foam pieces at a weight ratio of 8.5 percent pre-polymer to foam pieces. Table 19 shows the physical properties of a bonded foam underlayment produced using a pre-polymer containing 27 percent TDI, 38 percent castor oil polyol, and 35 percent process oil, and combined with the foam pieces at a weight ratio of 8.5 percent pre-polymer to foam pieces.

TABLE 17

Comparison of a pre-polymer utilizing TDI and a castor oil polyol with a pre-polymer utilizing TDI and a petrochemical polyol

| | Castor Pre-polymer Parts | Std. Pre-polymer Parts | Castor Pre-polymer % NCO | Std. Pre-polymer % NCO | Castor Pre-polymer OH # | Std. Pre-polymer OH # |
|---|---|---|---|---|---|---|
| Type I TDI Dow Vornanate T-80 | 27 | 25 | 48.3 | 48.3 | | |
| Castor Oil Polyol | 38 | | | | 164 | |
| Dow 3512 Polyol | | 50 | | | | 49 |
| Sundex 840 Process Oil | 35 | 25 | | | 0 | 0 |
| Totals: | 100 | 100 | 8.3 | 10.2 | | |

TABLE 17-continued

Comparison of a pre-polymer utilizing TDI and a castor oil polyol with a pre-polymer utilizing TDI and a petrochemical polyol

Laboratory Processing

| | |
|---|---|
| Wt. Ratio of pre-polymer to foam crumbs: | 9 percent |
| Steam time: | 1.5 mins |
| Drying time: | 48 hours |
| Density: | 5.2 pcf |

Laboratory Viscosities

| | Castor Oil Polyol | Dow Polyol 3512 |
|---|---|---|
| @ 77 Deg. F. (Unmixed): | 400 cp | 555 cp |
| @ 75 Deg. F. (Initial Pre-polymer Mix): | 50 cp | 30 cp |
| @ 90 Deg. F. Final Pre-polymer Mix (After 6 hours): | 490 cp | 50 cp |
| @ 72 Deg. F. Final Pre-polymer Mix (After 60 hours): | 2740 cp | |
| @ 90 Deg. F. Final Pre-polymer Mix (After 60 hours): | 710 cp | |

TABLE 18

Physical properties of 5 pcf foam bun with 8.5 percent pre-polymer
Castor Oil Polyol Pre-polymer Physical Property Comparative Analysis (without netting reinforcement)

Sample: Top

| Cut Position | Std. | Test | Diff. | Std. | Test | Diff. | Std. | Test | Diff. | Std. | Test | Diff. | Std. | Test | Diff. |
|---|---|---|---|---|---|---|---|---|---|---|---|---|---|---|---|
| | Density | | | CFD | | | Elongation | | | Tensile | | | Comp. Set | | |
| Left | 6.27 | 5.82 | −0.45 | 4.08 | 3.63 | −0.45 | 36.03 | 37.88 | 1.85 | 16.30 | 15.76 | −0.54 | 12.75 | 11.85 | −0.90 |
| Middle | 6.38 | 5.96 | −0.42 | 4.50 | 3.93 | −0.57 | 35.68 | 35.71 | 0.03 | 15.72 | 13.56 | −2.16 | 12.42 | 13.09 | 0.67 |
| Right | 6.19 | 5.81 | −0.38 | 3.88 | 3.53 | −0.35 | 33.26 | 40.29 | 7.03 | 14.77 | 14.00 | −0.77 | 12.00 | 11.59 | −0.41 |
| Avg. | | 5.86 | | | 3.70 | | | 37.96 | | | 14.44 | | | 12.18 | |
| High | | 5.96 | | | 3.93 | | | 40.29 | | | 15.76 | | | 13.09 | |
| Low | | 5.81 | | | 3.53 | | | 35.71 | | | 13.56 | | | 11.59 | |
| Range | | 0.15 | | | 0.40 | | | 4.58 | | | 2.20 | | | 1.50 | |

Sample: Middle

| Cut Position | Std. | Test | Diff. | Std. | Test | Diff. | Std. | Test | Diff. | Std. | Test | Diff. | Std. | Test | Diff. |
|---|---|---|---|---|---|---|---|---|---|---|---|---|---|---|---|
| | Density | | | CFD | | | Elongation | | | Tensile | | | Comp. Set | | |
| Left | 5.58 | 5.40 | −0.18 | 3.43 | 3.38 | −0.05 | 41.00 | 34.79 | −6.21 | 15.71 | 10.90 | −4.81 | 12.52 | 12.47 | −0.05 |
| Middle | 5.69 | 5.76 | 0.07 | 3.28 | 3.88 | 0.60 | 41.18 | 43.24 | 2.06 | 16.96 | 15.02 | −1.94 | 12.61 | 11.88 | −0.73 |
| Right | 5.48 | 5.51 | 0.03 | 3.28 | 4.30 | 1.02 | 40.56 | 46.38 | 5.82 | 15.23 | 5.88 | −9.35 | 13.22 | 12.26 | −0.96 |
| Avg. | | 5.56 | | | 3.85 | | | 41.47 | | | 10.60 | | | 12.20 | |
| High | | 5.76 | | | 4.30 | | | 46.38 | | | 15.02 | | | 12.47 | |
| Low | | 5.40 | | | 3.38 | | | 34.79 | | | 5.88 | | | 11.88 | |
| Range | | 0.36 | | | 0.92 | | | 11.59 | | | 9.14 | | | 0.59 | |

Sample: Bottom

| Cut Position | Std. | Test | Diff. | Std. | Test | Diff. | Std. | Test | Diff. | Std. | Test | Diff. | Std. | Test | Diff. |
|---|---|---|---|---|---|---|---|---|---|---|---|---|---|---|---|
| | Density | | | CFD | | | Elongation | | | Tensile | | | Comp. Set | | |
| Left | 5.55 | 5.75 | 0.20 | 3.23 | 3.90 | 0.67 | 40.47 | 36.38 | −4.09 | 15.43 | 14.49 | −0.94 | 13.52 | 11.30 | −2.22 |
| Middle | 5.67 | 5.81 | 0.14 | 3.20 | 4.13 | 0.93 | 36.92 | 35.26 | −1.66 | 15.89 | 7.30 | −8.59 | 14.17 | 12.32 | −1.85 |
| Right | 5.53 | 5.75 | 0.22 | 3.10 | 3.85 | 0.75 | 42.12 | 38.41 | −3.71 | 16.47 | 16.47 | 0.00 | 12.36 | 11.37 | −0.99 |
| Avg. | | 5.77 | | | 3.96 | | | 36.68 | | | 12.75 | | | 11.66 | |
| High | | 5.81 | | | 4.13 | | | 38.41 | | | 16.47 | | | 12.32 | |
| Low | | 5.75 | | | 3.85 | | | 35.26 | | | 7.30 | | | 11.30 | |
| Range | | 0.06 | | | 0.28 | | | 3.15 | | | 9.17 | | | 1.02 | |

TABLE 19

Physical properties of 5 pcf foam bun with 9.2 percent pre-polymer
Castor Oil Polyol Pre-polymer Physical Property Comparative Analysis (without netting reinforcement)

| | | | | | | | Sample: Left | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| Position | Density | | | CFD | | | Elongation | | | Tensile | | | Comp. Set | | |
| Top | 6.27 | 5.82 | (0.45) | 4.08 | 3.78 | (0.30) | 36.03 | 49.41 | 13.38 | 16.30 | 17.79 | 1.49 | 12.75 | 13.71 | 0.96 |
| Middle | 6.38 | 5.51 | (0.87) | 4.50 | 3.93 | (0.57) | 35.68 | 44.85 | 9.17 | 15.72 | 17.42 | 1.70 | 12.42 | 15.85 | 3.43 |
| Bottom | 6.19 | 6.02 | (0.17) | 3.88 | 3.85 | (0.03) | 33.26 | 37.50 | 4.24 | 14.77 | 14.31 | (0.46) | 12.00 | 13.18 | 1.18 |
| Avg. | 6.28 | 5.78 | (0.50) | 4.15 | 3.85 | (0.30) | 34.99 | 43.92 | 8.93 | 15.60 | 16.51 | 0.91 | 12.39 | 14.25 | 1.86 |
| High | 6.38 | 6.02 | | 4.50 | 3.93 | | 36.03 | 49.41 | | 16.30 | 17.79 | | 12.75 | 15.85 | |
| Low | 6.19 | 5.51 | | 3.88 | 3.78 | | 33.26 | 37.50 | | 14.77 | 14.31 | | 12.00 | 13.18 | |
| Range | 0.19 | 0.51 | | 0.62 | 0.15 | | 2.77 | 11.91 | | 1.53 | 3.48 | | 0.75 | 2.67 | |

| | | | | | | | Sample: Center | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| Position | Density | | | CFD | | | Elongation | | | Tensile | | | Comp. Set | | |
| Top | 5.58 | 5.12 | (0.46) | 3.43 | 3.68 | 0.25 | 41.00 | 43.18 | 2.18 | 15.71 | 16.52 | 0.81 | 12.52 | 14.60 | 2.08 |
| Middle | 5.69 | 5.46 | (0.23) | 3.28 | 3.58 | 0.30 | 41.18 | 45.24 | 4.06 | 16.96 | 15.53 | (1.43) | 12.61 | 14.53 | 1.92 |
| Bottom | 5.48 | 5.19 | (0.29) | 3.28 | 3.65 | 0.37 | 40.56 | 35.12 | (5.44) | 15.23 | 12.61 | (2.62) | 13.22 | 13.93 | 0.71 |
| Avg. | 5.58 | 5.26 | (0.33) | 3.33 | 3.64 | 0.31 | 40.91 | 41.18 | 0.27 | 15.97 | 14.89 | (1.08) | 12.78 | 14.35 | 1.57 |
| High | 5.69 | 5.46 | | 3.43 | 3.68 | | 41.18 | 45.24 | | 16.96 | 16.52 | | 13.22 | 14.60 | |
| Low | 5.48 | 5.12 | | 3.28 | 3.58 | | 40.56 | 35.12 | | 15.23 | 12.61 | | 12.52 | 13.93 | |
| Range | 0.21 | 0.34 | | 0.15 | 0.10 | | 0.62 | 10.12 | | 1.73 | 3.91 | | 0.70 | 0.67 | |

| | | | | | | | Sample: Right | | | | | | | | |
|---|---|---|---|---|---|---|---|---|---|---|---|---|---|---|---|
| Cut | Std. | Test | Diff. | Std. | Test | Diff. | Std. | Test | Diff. | Std. | Test | Diff. | Std. | Test | Diff. |
| Position | Density | | | CFD | | | Elongation | | | Tensile | | | Comp. Set | | |
| Top | 5.55 | 5.30 | (0.25) | 3.23 | 3.28 | 0.05 | 40.47 | 39.29 | (1.18) | 15.43 | 16.21 | 0.78 | 13.52 | 14.11 | 0.59 |
| Middle | 5.67 | 5.23 | (0.44) | 3.20 | 3.03 | (0.17) | 36.92 | 39.29 | 2.37 | 15.89 | 15.26 | (0.63) | 14.17 | 14.37 | 0.20 |
| Bottom | 5.53 | 5.12 | (0.41) | 3.10 | 3.53 | 0.43 | 42.12 | 42.03 | (0.09) | 16.47 | 15.47 | (1.00) | 12.36 | 14.95 | 2.59 |
| Avg. | 5.58 | 5.22 | (0.37) | 3.18 | 3.28 | 0.10 | 39.84 | 40.20 | 0.37 | 15.93 | 15.65 | (0.28) | 13.35 | 14.48 | 1.13 |
| High | 5.67 | 5.30 | | 3.23 | 3.53 | | 42.12 | 42.03 | | 16.47 | 16.21 | | 14.17 | 14.95 | |
| Low | 5.53 | 5.12 | | 3.10 | 3.03 | | 36.92 | 39.29 | | 15.43 | 15.26 | | 12.36 | 14.11 | |
| Range | 0.14 | 0.18 | | 0.13 | 0.50 | | 5.20 | 2.74 | | 1.04 | 0.95 | | 1.81 | 0.84 | |
| Grand Average | 5.82 | 5.42 | (0.40) | 3.55 | 3.59 | 0.04 | 38.58 | 41.77 | 3.19 | 15.83 | 15.68 | (0.15) | 12.84 | 14.36 | 1.52 |

While a number of preferred embodiments of the invention have been shown and described herein, modifications thereof may be made by one skilled in the art without departing from the spirit and the teachings of the invention. The embodiments described herein are exemplary only and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A pre-polymer for use as a binder in the manufacture of a bonded foam product comprising:
   a non-acidified isocyanate, a vegetable oil polyol, and a process oil,
   wherein the pre-polymer is substantially free of any petrochemical polyol,
   wherein the pre-polymer comprises about 37 weight percent isocyanate and about 20 weight percent vegetable oil polyol, and
   wherein substantially all of the balance of the pre-polymer is process oil.

2. The pre-polymer of claim 1 wherein the process oil is added to the pre-polymer to modify the viscosity of the propolymer.

3. The pre-polymer of claim 2 wherein the vegetable oil polyol is derived from a vegetable oil, and wherein the chemical structure of the vegetable oil is not substantially modified to form the vegetable oil polyol.

4. The pre-polymer of claim 3 wherein the vegetable oil polyol is castor oil polyol.

5. The pre-polymer of claim 4 wherein the viscosity of the pre-polymer is less than about 1,000 centipoise at about 90° F.

6. The pre-polymer of claim 5 wherein the viscosity of the pre-polymer is less than about 1,000 centipoise at about 90° F about 60 hours after combining the isocyanate and the vegetable oil polyol.

7. The pre-polymer of claim 6 further comprising: an antimicrobial chemical compound that discourages the growth of mildew and mold in a product manufactured with the pre-polymer.

8. The pre-polymer of claim 7 further comprising: a dimorpholinodiethylether catalyst that reduces the amount of moisture required to cure the pre-polymer.

9. A bonded foam product manufactured with the pre-polymer of any of claims 1, 2, or 3-8.

10. A method for making a bonded foam product, the method comprising:
  coating a plurality of foam pieces with a pre-polymer, the pre-polymer comprising from about 32 weight percent to about 42 weight percent of a non-acidified isocyanate and from about 15 weight percent to about 25 weight percent of a vegetable oil polyol, wherein substantially all of the balance of the pre-polymer is process oil, and wherein the pre-polymer is substantially free of any petrochemical polyol;
  compressing the foam pieces into a foam log of a desired density; and
  steaming the foam log to cure the pre-polymer,
  wherein the viscosity of the pre-polymer is less than about 1,000 centipoise at about 90° F.

11. The method of claim 10 wherein the process oil is added to the pre-polymer to modify the viscosity of the pre-polymer.

12. The method of claim 10 wherein the pre-polymer further comprises an antimicrobial chemical compound that discourages the growth of mildew and mold in a product manufactured with the pre-polymer.

13. The method of claim 10 wherein the vegetable oil polyol is derived from a vegetable oil, and wherein the chemical structure of the vegetable oil is not substantially modified to form the vegetable oil polyol.

14. The method of claim 13 wherein the vegetable oil polyol is castor oil polyol.

15. The method of claim 10 wherein the viscosity of the pre-polymer is less than about 1,000 centipoise at about 90° F about 60 hours after combining the isocyanate and the vegetable oil polyol.

16. A bonded foam underlayment manufactured according to the method of any of claims 10, 11, 12-14, or 15.

17. The pre-polymer of claim 1, wherein the isocyanate has an acidity of less than or equal to about 40 parts-per-million (ppm) hydrogen chloride (HCl).

18. The method of claim 10 wherein the isocyanate has an acidity of less than or equal to about 40 parts-per-million (ppm) hydrogen chloride (HCl).

19. The method of claim 10, wherein the pre-polymer comprises about 10 weight percent free isocyanates prior to coating the foam pieces.

20. The method of claim 11, wherein the pre-polymer comprises about 37 weight percent of the isocyanate and about 45 weight percent process oil, wherein substantially all of the balance of the pre-polymer is vegetable oil polyol.

21. A method comprising:
  coating a plurality of foam pieces with a pre-polymer, wherein the pre-polymer comprises from about 32 weight percent to about 42 weight percent of non-acidified isocyanate, from about 15 weight percent to about 25 weight percent of a castor oil polyol, and from about 38 weight percent to about 48 weight percent of a process oil, and wherein the pre-polymer is substantially free of any petrochemical polyol;
  compressing the foam pieces into a foam log of a desired density; and
  curing the foam log.

22. The method of claim 21 wherein the isocyanate has an acidity of less than or equal to about 40 pads-per-million (ppm) hydrogen chloride (HCl).

23. method comprising:
  coating a plurality of foam pieces with the pre-polymer of claim 1;
  compressing the foam pieces into a foam log of a desired density; and curing the foam log,
  wherein the compression is part of a log and peel process, an extrusion process, or a continuous extrusion process.

24. The method of claim 10, wherein the compression is part of a log and peel process, an extrusion process, or a continuous extrusion process.

25. The method of claim 21, wherein the compression is part of a log and peel process, an extrusion process, or a continuous extrusion process.

* * * * *

UNITED STATES PATENT AND TRADEMARK OFFICE
CERTIFICATE OF CORRECTION

PATENT NO.      : 7,566,406 B2
APPLICATION NO. : 11/230798
DATED           : July 28, 2009
INVENTOR(S)     : Stephen D. Gilder It is certified that error appears in the above-identified patent and that said Letters Patent is hereby corrected as shown below:

Col. 7 / Lines 24-25: replace "methylene-bis-cyclohexylisocyanate, and mixtures thereof Of course, it is" with -- methylene-bis-cyclohexylisocyanate, and mixtures thereof. Of course, it is --.

Col. 7 / Line 33: replace "The preferred isocyanates are Vomanate T-80" with -- The preferred isocyanates are Vornanate T-80 --.

Col. 8 / Line 50: replace "bis (2-dimethylaininoethyl) ether," with -- bis (2-dimethylaminoethyl) ether, --.

Col. 9 / Lines 31-32: replace "resulting from high exothenmic temperatures." with -- resulting from high exothermic temperatures. --.

Col. 10 / Lines 5-6: replace "preferably between about 800 and about 100 centipoise, and most" with -- preferably between about 800 and about 1000 centipoise, and most --.

Col. 11 / Line 8: replace "mold for compression thereof FIG 3 is an" with -- mold for compression thereof. FIG 3 is an --.

Col. 11 / Line 38: replace "the foam pieces can be varied by loaded more or less foam pieces" with -- the foam pieces can be varied by loading more or less foam pieces --.

Col. 13 / Lines 32-33: replace "which continues to be peeled form the continuing being peeled from the foam log 126." with -- which continues to be peeled from the foam log 126. --.

Col. 13 / Lines 63-64: replace "...upper conveyor 142 relative to the lower conveyor 142." with -- upper conveyor 144 relative to the lower conveyor 142. --.

Col. 16 / Lines 2-3: replace "The TDI was Dow Vomanate T-80 Type I TDI" with -- The TDI was Dow Vornanate T-80 Type I TDI --.

Col. 17 / Line 18: replace "the TDI was Dow Vomanate T-80 Type I TDI," with -- the TDI was Dow Vornanate T-80 Type I TDI, --.

Col. 21 / Lines 31-32: replace "the TDI was Dow Vomanate T-80 Type I TDI," with -- the TDI was Dow Vornanate T-80 Type I TDI, --.

UNITED STATES PATENT AND TRADEMARK OFFICE
CERTIFICATE OF CORRECTION

PATENT NO. : 7,566,406 B2
APPLICATION NO. : 11/230798
DATED : July 28, 2009
INVENTOR(S) : Stephen D. Gilder It is certified that error appears in the above-identified patent and that said Letters Patent is hereby corrected as shown below:

Col. 25 / Line 48: replace "the TDI was Dow Vomanate T-80 Type I TDI," with -- the TDI was Dow Vornanate T-80 Type I TDI, --.

Col. 26 / Lines 45-48: replace "1740 pounds of castor oil polyol/petrochemical polyol blend" with -- 174 pounds of castor oil polyol/petrochemical polyol blend --.

Claim 22 (Col. 42 / Line 24): replace "less than or equal to about 40 pads-per-million" with -- less than or equal to about 40 parts-per-million --.

Claim 23 (Col. 42 / Line 26): replace "method comprising:" with -- A method comprising: --.

Signed and Sealed this

First Day of December, 2009

David J. Kappos
*Director of the United States Patent and Trademark Office*